United States Patent
Lavallee et al.

(10) Patent No.: US 9,607,102 B2
(45) Date of Patent: Mar. 28, 2017

(54) TASK SWITCHING IN DIALOGUE PROCESSING

(71) Applicant: Nuance Communications, Inc., Burlington, MA (US)

(72) Inventors: Jean-Francois Lavallee, Verdun (CA); Jacques-Olivier Goussard, Greenfield Park (CA); Richard Beaufort, Corbais (BE)

(73) Assignee: Nuance Communications, Inc., Burlington, MA (US)

( * ) Notice: Subject to any disclaimer, the term of this patent is extended or adjusted under 35 U.S.C. 154(b) by 99 days.

(21) Appl. No.: 14/478,121

(22) Filed: Sep. 5, 2014

(65) Prior Publication Data

US 2016/0070696 A1    Mar. 10, 2016

(51) Int. Cl.
| | | |
|---|---|---|
| G06F 17/40 | (2006.01) | |
| G06F 17/30 | (2006.01) | |
| G10L 15/00 | (2013.01) | |
| G06F 3/16 | (2006.01) | |

(52) U.S. Cl.
CPC ........ *G06F 17/30976* (2013.01); *G10L 15/00* (2013.01); *G06F 3/167* (2013.01)

(58) Field of Classification Search
None
See application file for complete search history.

(56) References Cited

U.S. PATENT DOCUMENTS

| | | | | |
|---|---|---|---|---|
| 6,330,539 B1* | 12/2001 | Takayama | ........... | G10L 15/1822 704/251 |
| 7,720,684 B2* | 5/2010 | Huerta | ..................... | G10L 15/22 704/231 |
| 8,065,148 B2* | 11/2011 | Huerta | ..................... | G10L 15/22 704/201 |
| 8,073,681 B2* | 12/2011 | Baldwin | ................ | G10L 15/22 704/270 |
| 8,645,456 B2* | 2/2014 | Li | ........................... | H04W 4/18 709/202 |
| 8,706,079 B1* | 4/2014 | Baker | ................. | G06Q 10/103 455/405 |
| 9,195,936 B1* | 11/2015 | Chase | ....................... | G06F 8/65 |

(Continued)

*Primary Examiner* — Pierre-Louis Desir
*Assistant Examiner* — Jonathan Kim
(74) *Attorney, Agent, or Firm* — Banner & Witcoff, Ltd.

(57) ABSTRACT

Disclosed methods and systems are directed to task switching in dialog processing. The methods and systems may include activating a primary task, receiving, one or more ambiguous natural language commands, and identifying a first candidate task for each of the one or more ambiguous natural language commands. The methods and system may also include identifying, for each of the one or more ambiguous natural language commands and based on one or more rules, a second candidate task of the plurality of tasks corresponding to the ambiguous natural language command, determining whether to modify at least one of the one or more rules-based task switching rules based on whether a quality metric satisfies a threshold quantity, and when the second quality metric satisfies the threshold quantity, changing the task switching rule for the corresponding candidate task from a rules-based model to the optimized statistical based task switching model.

20 Claims, 36 Drawing Sheets

(56) References Cited

U.S. PATENT DOCUMENTS

| | | | | |
|---|---|---|---|---|
| 2003/0040850 A1* | 2/2003 | Najmi | ................... | G06F 3/0482 |
| | | | | 701/1 |
| 2005/0149331 A1* | 7/2005 | Ehrlich | .............. | H04M 3/4938 |
| | | | | 704/270.1 |
| 2008/0262848 A1* | 10/2008 | Shienbrood | ......... | H04M 3/4936 |
| | | | | 704/275 |
| 2012/0324434 A1* | 12/2012 | Tewari | ...................... | G06F 8/60 |
| | | | | 717/168 |
| 2015/0379993 A1* | 12/2015 | Subhojit | ................ | G10L 15/06 |
| | | | | 704/275 |
| 2016/0012820 A1* | 1/2016 | Mun | ...................... | G10L 15/32 |
| | | | | 704/251 |

* cited by examiner

EXAMPLE 1

Dialogue 1402

[System] How can I help you
[USER] Pay credit card bill
[System] How much do you want to pay?
[USER] Balance
[System] For which account?
[USER] Pay $10 on cable bill from my checking account
[System] Paid
[System] See balance for which account?

EXAMPLE 2

Dialogue 1404

[System] How can I help you
[USER] Pay credit card bill
[System] How much do you want to pay?
[USER] Balance
[System] For which account?
[USER] Pay $10 on cable bill from my checking account
[System] Paid
[System] How much do you want to pay?

| | NEW TRANSFER 2708a | NEW PAY BILL 2708b | NEW BALANCE 2708c | CONTINUE TRANSFER 2708d |
|---|---|---|---|---|
| INTENT:PAY<br>AMOUNT:50<br>FROM:Checking<br>BILL:CC  2706a | 2710a | 2710b | 2710c | 2710d |
| INTENT:PAY<br>AMOUNT:50<br>FROM:Shared<br>BILL:CC  2706b | 2710e | 2710f | 2710g | 2710h |
| INTENT:TRANSFER<br>AMOUNT:50  2706c<br>FROM:Checking | 2710i | 2710j | 2710k | 2710l |
| INTENT:TRANSFER<br>AMOUNT:50<br>FROM:Shared  2706d | 2710m | 2710n | 2710o | 2710p |
| AMOUNT:50<br>FROM:Checking<br>TO:CC  2706e | 2710q | 2710r | 2710s | 2710t |
| AMOUNT:50<br>FROM:Shared<br>TO:CC  2706f | 2710u | 2710v | 2710w | 2710x |

2704 ← (pointing to label column)
2702 ←

Fig. 27

| Current:Transfer | NEW TRANSFER 2708a | NEW PAY BILL 2708b | NEW BALANCE 2708c | CONTINUE TRANSFER 2708d |
|---|---|---|---|---|
| INTENT:PAY AMOUNT:50 FROM:Checking BILL:CC 2706a | REFUSED | REFUSED | REFUSED | ALLOWED 2710d |
| INTENT:PAY AMOUNT:50 FROM:Shared BILL:CC 2706b | REFUSED 2710a | REFUSED 2710b | REFUSED 2710c | ALLOWED 2710h |
| INTENT:TRANSFER AMOUNT:50 2706c FROM:Checking | ALLOWED 2710e | REFUSED 2710f | REFUSED 2710g | REFUSED 2710l |
| INTENT:TRANSFER AMOUNT:50 FROM:Shared 2706d | ALLOWED 2710i | REFUSED 2710j | REFUSED 2710k | REFUSED 2710p |
| AMOUNT:50 FROM:Checking TO:CC 2706e | REFUSED 2710m | REFUSED 2710n | REFUSED 2710o | ALLOWED 2710t |
| AMOUNT:50 FROM:Shared TO:CC 2706f | REFUSED 2710q | REFUSED 2710r | REFUSED 2710s | ALLOWED 2710x |

Fig. 28

| Current.Transfer 3202 | NEW TRANSFER 2708a | NEW PAY BILL 2708b | NEW BALANCE | CONTINUE TRANSFER 2708d |
|---|---|---|---|---|
| INTENT:PAY AMOUNT:50 FROM:Checking BILL:CC 2706a | 0.09 | 0.4 | 0 | 0.23 |
| | 2710a | 2710b | 2710c | 2710d |
| INTENT:PAY AMOUNT:50 FROM:Shared BILL:CC 2706b | 0.01 | 0.3 | 0 | 0.18 |
| | 2710e | 2710f | 2710g | 2710h |
| INTENT:TRANSFER AMOUNT:50 FROM:Checking 2706c | 0.35 | 0.15 | 0 | 0.31 |
| | 2710i | 2710j | 2710k | 2710l |
| INTENT:TRANSFER AMOUNT:50 FROM:Shared 2706d | 0.15 | 0.07 | 0 | 0.18 |
| | 2710m | 2710n | 2710o | 2710p |
| AMOUNT:50 FROM:Checking TO:CC 2706e | 0.3 | 0.05 | 0 | 0.19 |
| | 2710q | 2710r | 2710s | 2710t |
| AMOUNT:50 FROM:Shared TO:CC 2706f | 0.1 | 0.03 | 0 | 0.18 |
| | 2710u | 2710v | 2710w | 2710x |

Fig. 30

| | NEW TRANSFER 2708a | NEW PAY BILL 2708b | NEW BALANCE | CONTINUE TRANSFER 2708d |
|---|---|---|---|---|
| Rejection:0.05  3202 | 0.09 | 0.4 | 0 | 0.23 2708c |
| INTENT:PAY AMOUNT:50 FROM:Checking BILL:CC  2706a | 2710a | 0.3 2710b | 0 | 0.18 2710d 2710c |
| INTENT:PAY AMOUNT:50 FROM:Shared BILL:CC  2706b | 0.01 2710e | 0.15 2710f | 0 2710g | 2710h |
| INTENT:TRANSFER AMOUNT:50 FROM:Checking 2706c | 0.35 2710i | 0.07 2710j | 2710k | 0.31 2710l |
| INTENT:TRANSFER AMOUNT:50 FROM:Shared  2706d | 0.15 2710m | 0.05 2710n | 0 2710o | 0.18 2710p |
| AMOUNT:50 FROM:Checking TO:CC  2706e | 0.3 2710q | 0.03 2710r | 0 2710s | 0.19 2710t |
| AMOUNT:50 FROM:Shared TO:CC  2706f | 0.1 2710u | 2710v | 0 2710w | 0.18 2710x |

TASK SWITCHING IN DIALOGUE PROCESSING

FIELD

This application generally relates to computers and computer software. More specifically, aspects described herein relate to natural language processing software applications, and to task switching in conversational dialogue software applications.

BACKGROUND

Natural Language Processing (NLP) and Natural Language Understanding (NLU) involve using computer processing to extract meaningful information from natural language inputs (e.g., spoken or text-based). More applications are using NLP and NLU to interact with users. Thus, there is an ever present need for these applications to provide a human-like, natural task flow in their interaction with users.

SUMMARY

The following presents a simplified summary in order to provide a basic understanding of some aspects of the disclosure. This summary is not an extensive overview of the disclosure. It is intended neither to identify key or critical elements of the disclosure nor to delineate the scope of the disclosure. The following summary merely presents some concepts of the disclosure in a simplified form as a prelude to the description below.

A task may be composed of one or more operations that may need to be performed before completing a goal (e.g., transferring money from a bank account). Task switching may include the ability to deactivate a task (e.g., put a task aside before all of its operations are completed) in order to complete another task. The deactivated task may be paused, such that any progress of the interrupted task might not be lost.

A dialogue application may be an application that may include a natural language interface that might not expect a user to complete a task in a single input (e.g., speech input). In some aspects, a dialogue application's task flow might be a major component in the application's design. The task flow of an application may describe how tasks can be combined together to achieve a higher level goal. Most applications may follow a task flow. For example, the dialogue application's graphical user-interface (GUI) may follow a strict task flow which may be enforced through visual cues on the interface. In another example, a text interface of a dialogue application may follow an even stricter task flow, such that all necessary information for the text interface may need to be provided in a specific order. Such a dialogue application may be referred to herein as an application.

With an NLP and/or NLU interface, it might not be feasible to expect that the user will follow the task flow originally implemented by the application's developer and/or programmed into the application. For example, a lack of visual cues in the application might not allow developer to communicate to the user what the user can and cannot do at any given point in time. Additionally, a user may ambiguously provide input into an application, and the application may reject any of this input that might not fit the developer's task flow or expectation.

In an example of a banking dialogue application, when a user may be in the middle of a transfer or a payment, the user may request the balance of one of the user's accounts. If the implemented task flow does not support this balance request, the application may either ask the user to repeat the input or may wrongly interpret the input. Further, due to a lack of visual cues, a user may get stuck in the dialogue (e.g., going through all sorts of options and requests for additional information), because the user and/or application might not know how to proceed. Thus, in some situations, the user's request for the balance of an account may result in, for example, a transfer of money from an account with insufficient funds and/or the user restarting the whole process, which may result in wasted time and frustration.

Accordingly, disclosed embodiments provide for supporting natural application task flows that a user might implement when using a dialogue application. Disclosed embodiments provide flexibility in managing task interruptions by allowing or not allowing rules or restrictions to implemented that may, for example, allow or not allow some currently active operations/tasks (such as bank transferring task) to be interrupted by other operations/tasks (such as a balance checking task).

One or more aspects of the disclosure provide for a method that may include activating, by a computing device and with an application comprising a plurality of tasks, a primary task in response to receiving a first natural language command of one or more words, the computing device being configurable with one or more rules-based task switching rules for determining one or more secondary tasks, the secondary tasks comprising tasks that cannot be activated while one or more primary tasks are activated and tasks that can be activated while one or more primary tasks are activated; receiving, while the primary task is activated, one or more ambiguous natural language commands; and determining at least one candidate task of the plurality of tasks for each of the one or more ambiguous natural language commands. The method may further include assigning a score to each of the candidate tasks using a statistical-based task switching model; identifying, based on the assigned scores, a first candidate task of the one or more candidate tasks for each of the one or more ambiguous natural language commands; and identifying, for each of the one or more ambiguous natural language commands and based on the one or more rules of the rules-based task switching rules, a second candidate task of the plurality of tasks corresponding to the ambiguous natural language command. The method may also include identifying an optimal task of the plurality of tasks for each of the one or more ambiguous natural language commands; optimizing the statistical task switching model based on a first quality metric, the first quality metric being based on the identified optimal tasks; calculating a second quality metric based on whether at least a portion of the identified first candidate tasks correspond to the secondary tasks; determining whether to modify at least one of the one or more rules-based task switching rules based on whether the second quality metric satisfies a threshold quantity; and when the second quality metric satisfies the threshold quantity, changing the task switching rule for the corresponding candidate task from a rules-based model to the optimized statistical based task switching model.

One or more aspects of the disclosure provide for a system that includes at least one processor; and at least one memory storing instructions that, when executed by the at least one processor, cause the system to perform one or more steps. The steps the system may perform may include activating, by a computing device and with an application comprising a plurality of tasks, a primary task in response to receiving a first natural language command of one or more words, the computing device being configurable with one or more rules-based task switching rules for determining one or more secondary tasks, the secondary tasks comprising tasks that cannot be activated while one or more primary tasks are activated and tasks that can be activated while one or more primary tasks are activated; receiving, while the primary task is activated, one or more ambiguous natural language commands; and determining at least one candidate task of the plurality of tasks for each of the one or more ambiguous natural language commands. The steps may also include assigning a score to each of the candidate tasks using a statistical-based task switching model; identifying, based on the assigned scores, a first candidate task of the one or more candidate tasks for each of the one or more ambiguous natural language commands; and identifying, for each of the one or more ambiguous natural language commands and based on the one or more rules of the rules-based task switching rules, a second candidate task of the plurality of tasks corresponding to the ambiguous natural language command. The steps may also include identifying an optimal task of the plurality of tasks for each of the one or more ambiguous natural language commands; optimizing the statistical task switching model based on a first quality metric, the first quality metric being based on the identified optimal tasks; calculating a second quality metric based on whether at least a portion of the identified first candidate tasks correspond to the secondary tasks; determining whether to modify at least one of the one or more rules-based task switching rules based on whether the second quality metric satisfies a threshold quantity; and when the second quality metric satisfies the threshold quantity, changing the task switching rule for the corresponding candidate task from a rules-based model to the optimized statistical based task switching model.

One or more aspects of the disclosure provide for one or more non-transitory computer-readable storage media having instructions stored thereon, that when executed by one or more processors, may cause the one or more processors to perform steps. The steps that the one or more processors perform may include activating, by a computing device and with an application comprising a plurality of tasks, a primary task in response to receiving a first natural language command of one or more words, the computing device being configurable with one or more rules-based task switching rules for determining one or more secondary tasks, the secondary tasks comprising tasks that cannot be activated while one or more primary tasks are activated and tasks that can be activated while one or more primary tasks are activated; receiving, while the primary task is activated, one or more ambiguous natural language commands; and determining at least one candidate task of the plurality of tasks for each of the one or more ambiguous natural language commands. The steps may also include assigning a score to each of the candidate tasks using a statistical-based task switching model; identifying, based on the assigned scores, a first candidate task of the one or more candidate tasks for each of the one or more ambiguous natural language commands; and identifying, for each of the one or more ambiguous natural language commands and based on the one or more rules of the rules-based task switching rules, a second candidate task of the plurality of tasks corresponding to the ambiguous natural language command. The steps may also include identifying an optimal task of the plurality of tasks for each of the one or more ambiguous natural language commands; optimizing the statistical task switching model based on a first quality metric, the first quality metric being based on the identified optimal tasks; calculating a second quality metric based on whether at least a portion of the identified first candidate tasks correspond to the secondary tasks; determining whether to modify at least one of the one or more rules-based task switching rules based on whether the second quality metric satisfies a threshold quantity; and when the second quality metric satisfies the threshold quantity, changing the task switching rule for the corresponding candidate task from a rules-based model to the optimized statistical based task switching model.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 14 depicts an illustrative diagram showing examples of reactivating stacked tasks in accordance with one or more features described herein.

FIG. 27 depicts an example matrix in accordance with one or more features described herein.

FIG. 28 depicts an example matrix in accordance with one or more features described herein.

FIG. 30 depicts an example matrix in accordance with one or more features described herein.

FIG. 32 depicts an example matrix in accordance with one or more features described herein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Figure 1:
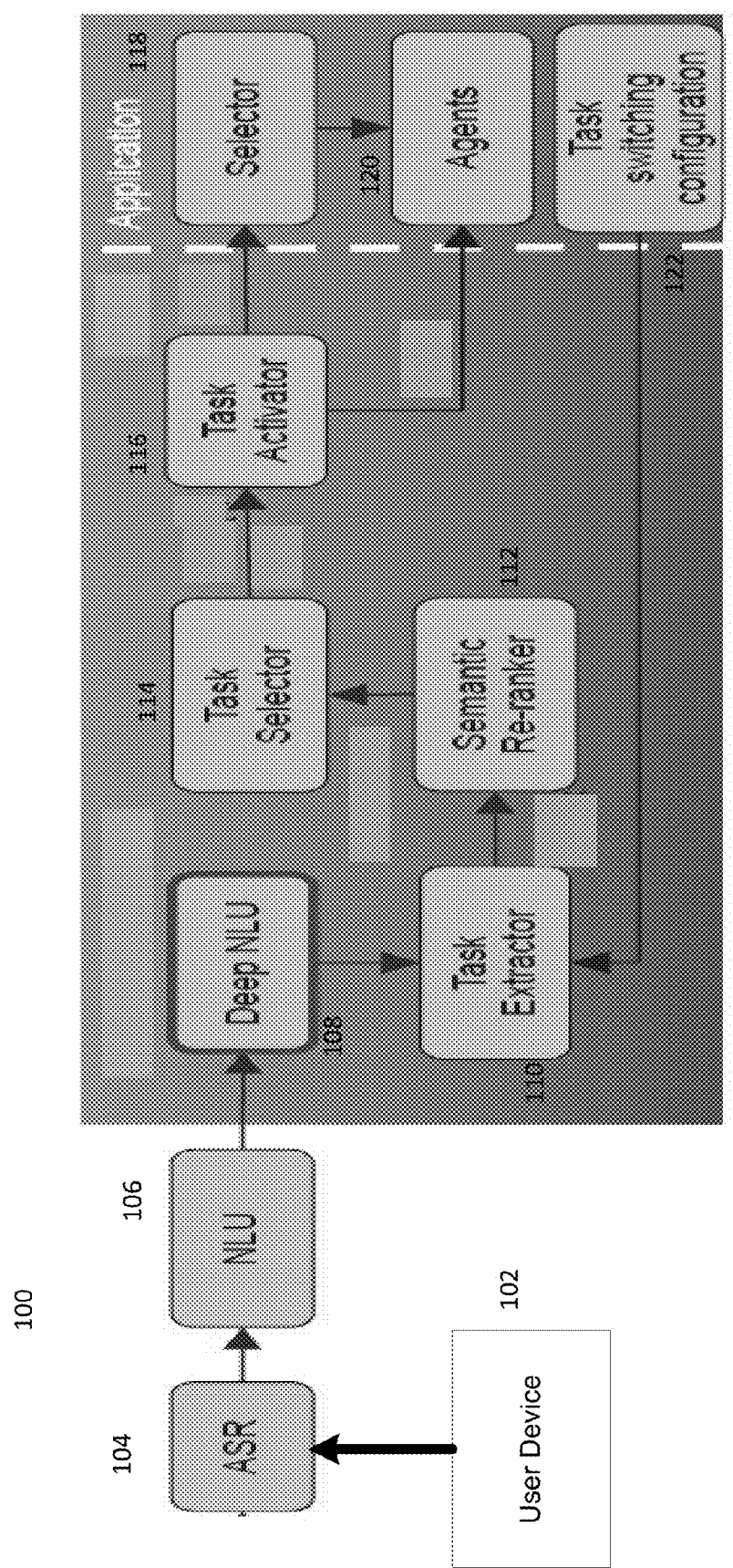
FIG. 1 depicts an illustrative diagram showing an example system in accordance with one or more features described herein.
Figure 36:
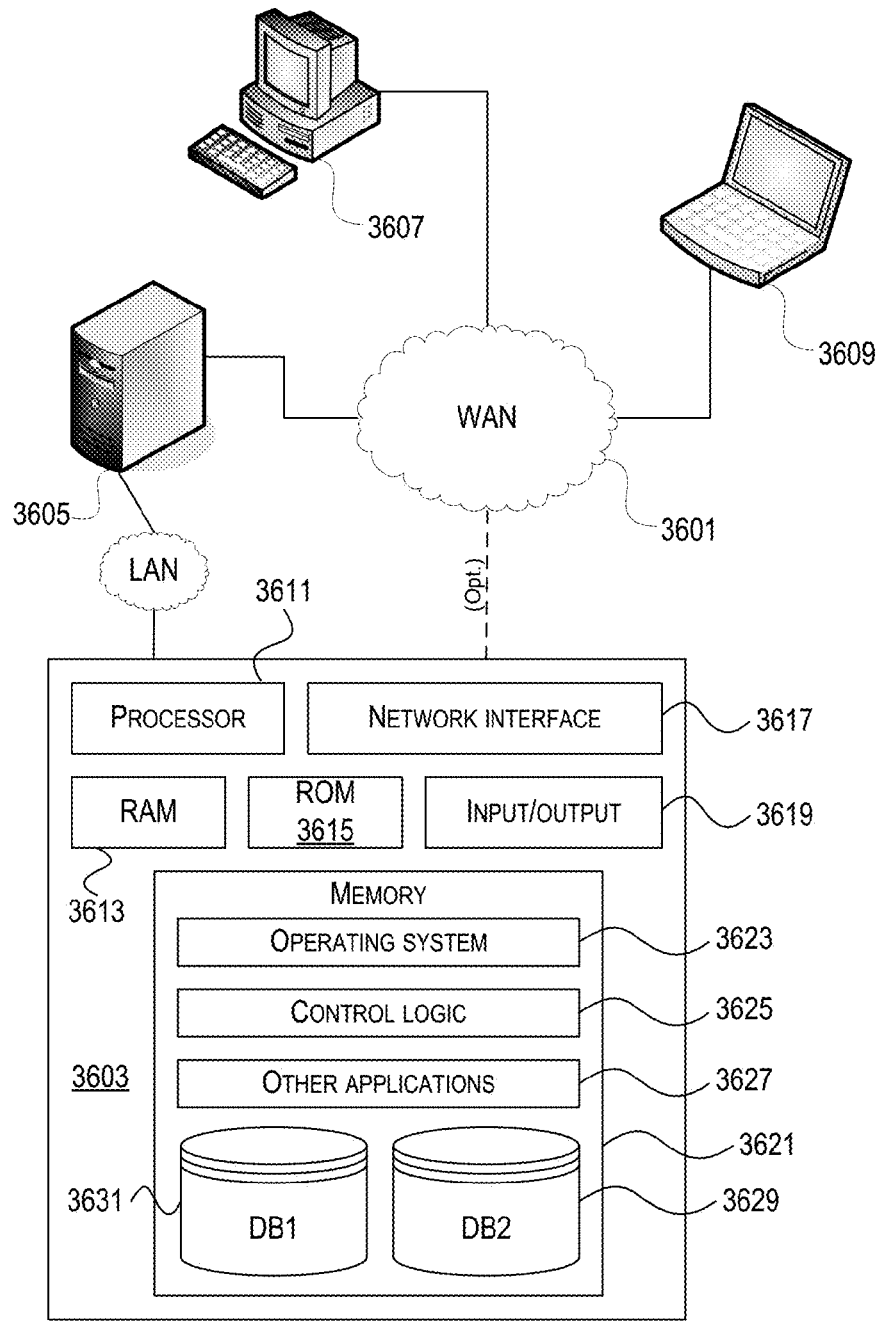
FIG. 36 depicts an illustrative diagram showing an example system in accordance with one or more features described herein.

FIG. 1 is an illustrative system 100 that may implement one or more features described herein. System 100 may be an automatic conversational system having multiple computer-implemented dialogue components for conducting an automated dialogue process with a user. System 100 may allow for a human-machine dialogue arrangement. According to some aspects, the arrangement may include multiple computer-implemented dialogue components, which may be configured to intercommunicate and use context to narrow down understanding, recognition, and/or reasoning errors. In some embodiments, the system may detect and/or resolve anaphora based on linguistic cues, dialogue context, and/or general knowledge. Components of system 100 may be similar to and/or the same as components of system 3600, as shown in FIG. 36. Components of system 100 may be connected via one or more networks (e.g., LAN, WAN, etc.)

System 100 may comprise a user client 102, which may be similar to or the same as nodes 3603, 3605, 3607, or 3609, as shown in FIG. 36. User client 102 may deliver output prompts to a human user (or other entity/device capable of inputting/producing speech/word inputs) and may receive dialogue inputs including speech inputs from the user. The user client 102 may be a computing device, such as a mobile device, laptop, and the like, and/or may reside on a computing device or embedded platform. The user client 102 may display a user interface, provide touch input, and the like. In some embodiments, the system may utilize a client-server architecture, for example, where the user client 102 resides on a mobile device.

System 100 may comprise an automatic speech recognition (ASR) engine 104, which may be a software and/or hardware component of system 100, and may process the speech inputs to determine corresponding sequences of representative text words. For example, the ASR 104 may produce one or more transcriptions of a speech input. The ASR 104 may interact with a dialogue manager, which may decide what the next action should be after each user input.

System 100 may comprise a natural language understanding (NLU) engine 106, which may be a software and/or hardware component of system 100, and may process the text words to determine corresponding semantic interpretations. For example, the NLU 106 may parse a transcription and may produce one or more semantic interpretations for each of the transcripts.

System 100 may comprise a deep natural language understanding (deep NLU) engine 108, which may be a software and/or hardware component of system 100, and may further process the semantic interpretations. For example, the deep NLU 108 may resolve any anaphora that may be present in the semantic interpretations.

System 100 may comprise a task extractor 110, which may be a software and/or hardware component of system 100, and may analyze the interpretations and retrieve information for tasks relative to an interpretation. For example, the task extractor 110 may determine which tasks may be performed and which tasks might not be performed.

System 100 may comprise a semantic re-ranker 112, which may be a software and/or hardware component of system 100, and may determine which NLU interpretation might be most likely to be used for the current user input. The semantic re-ranker 112 may re-rank NLU-ranked semantic interpretations, for example, based on at least one of dialog context information and world knowledge information System 100 may comprise a task selector 114, which may assign one of these tasks for activation. This assignment may be based on contextual information, rules or restrictions, grammar, entries of a scored matrix, and the like. In some embodiments, the contextual information may include client context information, for example, reflecting context of the user client within the dialogue process and/or NLU context information reflecting context of the NLU engine 106 within the dialogue process.

System 100 may comprise a task activator 116, which may activate the task and/or an associated agent/operation by transmitting the selected task and/or condition to a selector 118 and/or tasks agents 120. In some cases, selector may invoke and/or activate tasks agents 120. The task switching configuration engine 122 may be used to enable/disable task switching, such as switching the configuration of the components of system 100. This will be explained below in more detail. According to some aspects, a dialogue application may comprise the selector 118, agents 120, and/or task switching configuration engine 122.

According to some aspects, a dialogue manager may generate output prompts and/or respond to the semantic interpretations so as to manage a dialogue process with the human user. The dialogue components may share context information with each other using a common context sharing mechanism such that the operation of each dialogue component reflects available context information.

Figure 2:
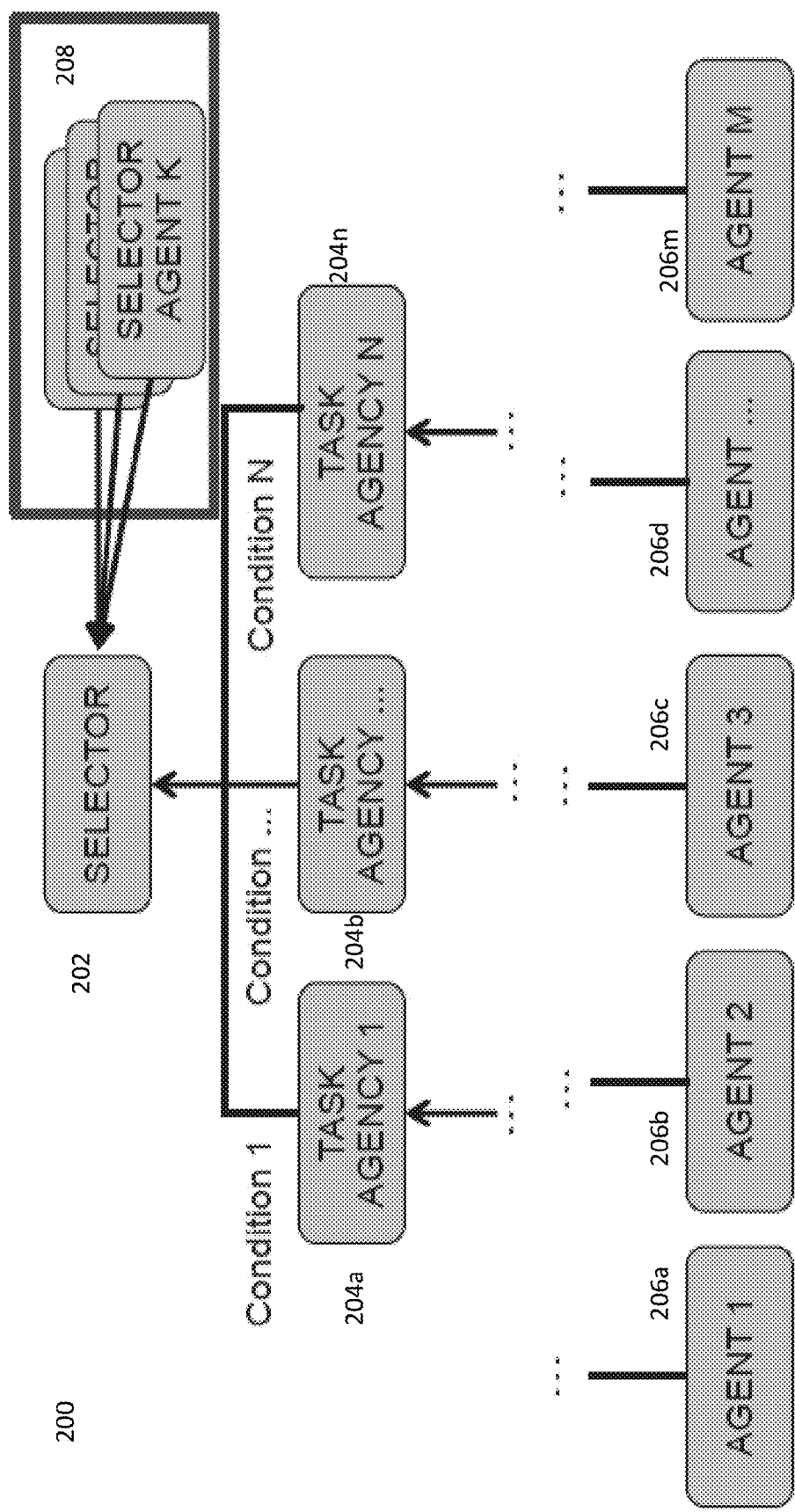
FIG. 2 depicts an illustrative diagram showing an example system in accordance with one or more features described herein.

FIG. 2 illustrates an example system 200 illustrating a task agent tree in accordance with disclosed aspects herein. According to some aspects, tasks may be composed of one or more operations that might need to be completed before completing a larger goal. These operations may be for a dialogue application, which may be an application with a natural language interface that might not expect a task to be completed in response to a single input. A task flow of an application may describe how a task may be combined with other tasks to achieve a goal. Components of system 200 may be similar to and/or the same as components of system 3600, as shown in FIG. 36. According to some aspects, components of system 3600 may comprise components of system 200.

According to some aspects, in order to achieve this goal, an application may employ task switching. Tasks switching may include activating a task, and then pausing that task before one or more of its operations are completed in order to start and/or complete another task. In some cases, the progress of the interrupted task might not be lost and may be restarted after the completion of another task's operation(s).

System 200 may include a selector 202, which may be similar or the same as task selector 118, and which may select a task agency (e.g., task) based on one or more conditions. These conditions may be based on interpretations of dialogue input into system 100 or system 200. System 200 may include one or more task agencies 204a, 204b, 204n. In some embodiments, for a task to be active, a corresponding condition might be needed to be met. Each task 204 may comprise one or more agents 206a, 206b, 206c, 206d, 206m. In some situations, a tasks agency 204 may comprise another task agency.

In some embodiments, when a task 204 is inactive, then none of its agents may collect information and/or be activated. Further, if a corresponding condition is met, then a task 204 may be activated, and a corresponding agent 206 may begin to collect information. This may be referred to as task activation. Activation conditions may be based on one or more semantic slot values 208, which may communicate with the selector 202. Examples of slot values may be domain, intent, etc. A slot value 208 may correspond to a task, and may be used to identify the action to be taken by the application.

Figure 3:
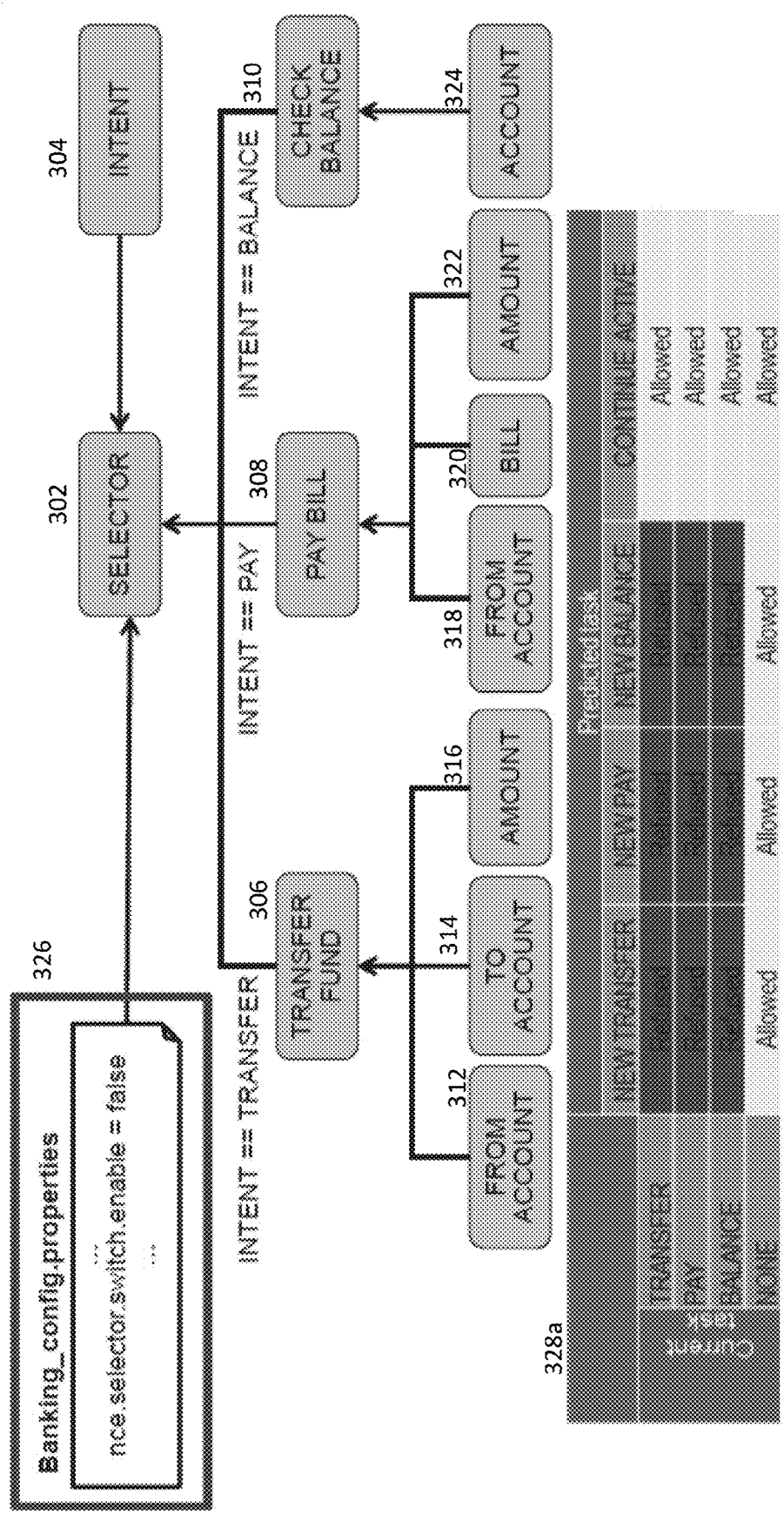
FIG. 3 depicts an illustrative diagram showing an example system in accordance with one or more features described herein.

FIG. 3 illustrates an example system 300 illustrating a task agent tree in accordance with disclosed aspects herein. Components of system 300 may be similar to and/or the same as components of system 200 and other systems disclosed herein. System 300 may an example of a banking dialogue system and/or application. System 300 may include a selector 302, a slot value 304 (e.g., intent), three tasks (e.g., transfer fund 306, pass bill 308, check balance 310), 7 task agents (e.g., from account 312, to account 314, amount 316, from account 318, bill 320, amount 322, and account 324). Task 306 may be associated with the condition of intent to transfer, task 308 may be associated with the condition of intent to pay, and condition 310 may be associated with the condition of intent to determine a balance. Agents 312, 314, and 316 may be associated with task 306, agents 318, 320, and 322 may be associated with task 308, and agent 324 may be associated with 310. Thus, according to some aspects, a task's corresponding agents might not be activated until the task is activated. For example, it system 300 determined that the intent of an input was to transfer money, and a corresponding condition was met, then task 306 may be activated, and one of agents 312, 314, and 316 may be activated and/or may begin to collect information associated with task 306 and/or input (e.g., by asking questions of a user to collect this information). Components of system 300 may be similar to and/or the same as components of system 3600, as shown in FIG. 36. According to some aspects, components of system 3600 may comprise components of system 300.

System 300 may also include configuration engine 326, which may be used to disable or enable task switching for the system 300. In some embodiments, engine 326 may be similar to and/or the same as engine 122. As stated above, task switching may include activating tasks, and then pausing (e.g., putting that task aside) that task before one or more of its operations are completed in order to start and complete another task. For example, if the intent of a first dialogue input is to transfer, then task 306 may be activated. Then, if the intent of a second dialogue input is to pay, then task 306 may be paused, and task 308 may be activated. This will be described below in more detail. As shown in FIG. 3, engine 326 may assign a false value to a task activation parameter, which may disable the task switching ability of selector 302. This may be shown by chart 328a. Chart 328a illustrates the current tasks (e.g., transfer, pay, balance, or no current task) and the predicted or subsequent task (e.g., new transfer, new pay, new balance, or continue active task). Chart 328a-c may further illustrate rules or restrictions for task switching (e.g., when a new predicted task cannot interrupt a currently active task). For example, the predicted tasks may be tasks that may or might not interrupt the current task. Because the task switching has been disabled in this example, chart 328c illustrates that all new predicted tasks may be refused activation when any task is currently active, and that the currently active task may be continued. Further, if there is no currently active task (e.g., "none"), then all tasks may be activated (e.g., allowed).

Figure 4:
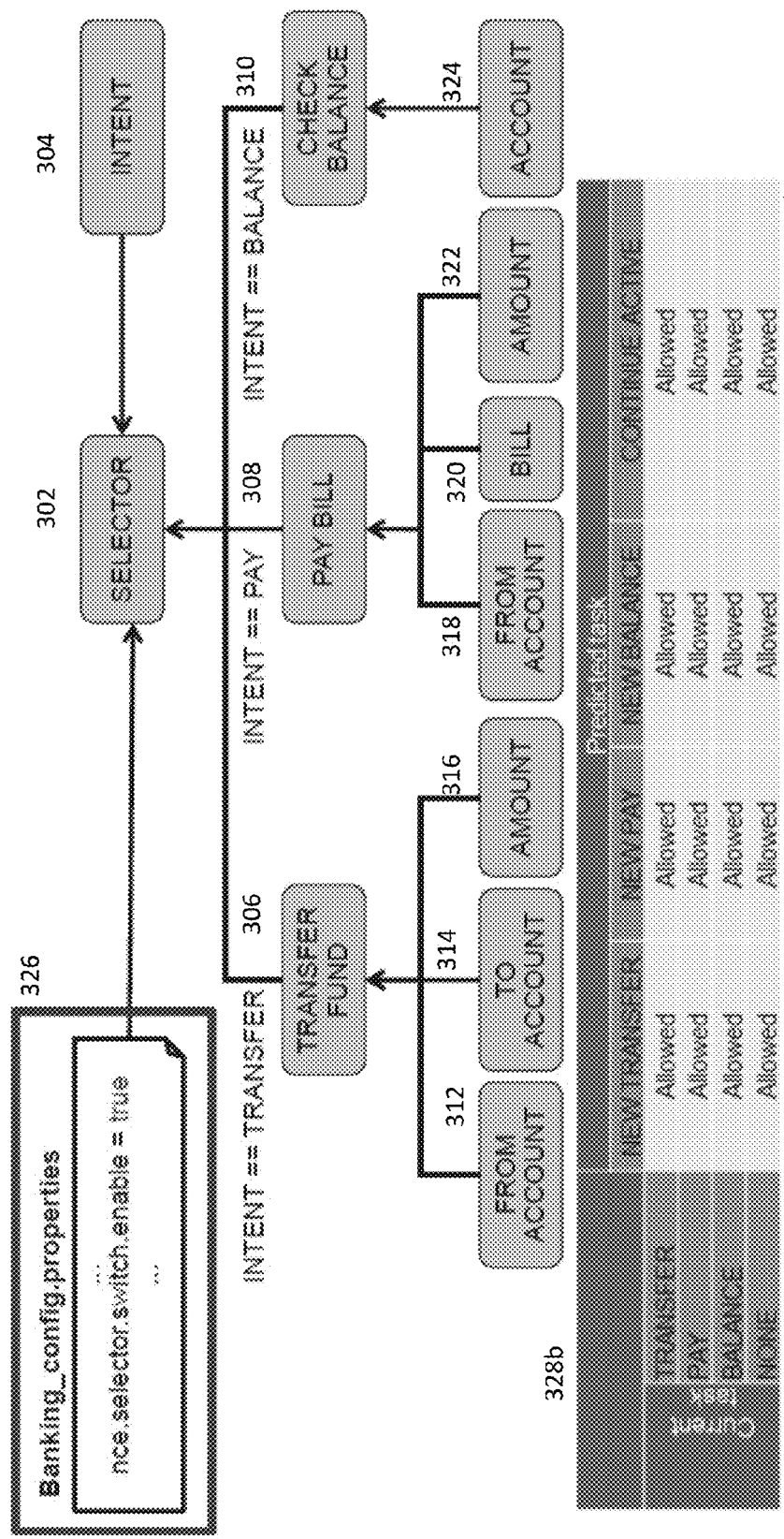
FIG. 4 depicts an illustrative diagram showing an example system in accordance with one or more features described herein.

FIG. 4 illustrates system 400, which may be substantially the same as system 300. In system 400, engine 326 may assign a true value to the task switching parameter, which may activate task switching for system 400, which may be shown by chart 328*b*. Chart 328*b* illustrates that all current tasks may be interrupted by any subsequent task (e.g., "allowed"). Thus, there might be no rules or restrictions in chart 328*b*, as chart 328*b* might include all allowances.

Figure 5:
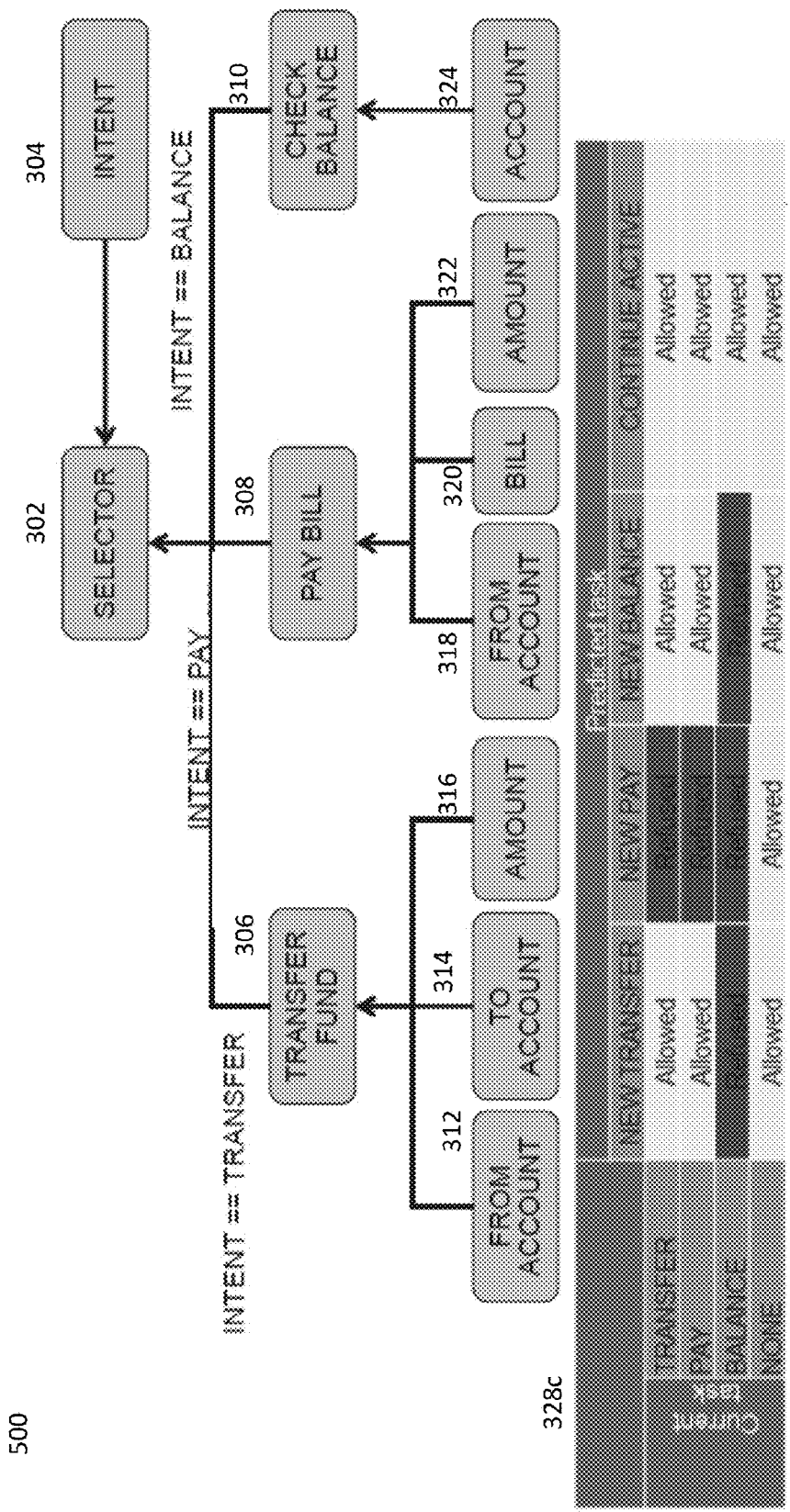
FIG. 5 depicts an illustrative diagram showing an example system in accordance with one or more features described herein.

FIG. 5 illustrates system 500, which may be substantially the same as system 300. In system 500, a true value may be assigned to a task switching parameter (as in system 400), which may activate task switching for system 500, which may be shown by chart 328*c*. Chart 328*c* illustrates some rules or restrictions placed on selector 302 based on the current task. Chart 328*c* illustrates that the pay bill task 308 might not interrupt another task, even another pay bill task. Chart 328*c* illustrates that the check balance task 310 may be activated during another task. Chart 328*c* also illustrates that the check balance task 310 might not be interrupted. Chart 328*c* illustrates that the transfer fund tasks 306 might not be activated while the check balance task 310 is currently activated. Chart 328*c* also illustrates that if there is no currently active task (e.g., "none"), then all tasks may be activated (e.g., allowed). Thus, in accordance with the disclosed features, any combination of allowances and/or rules or restrictions may be implemented for tasks.

According to some embodiments, the rules or restrictions may include which task might not interrupt another task. For example, a dialogue application may be able to switch from a transfer task to a check balance task, but not from a transfer task to a payment task. According to some aspects, the rules or restrictions may include which data might need to captured before switching to a particular task. This may include intent or domain information. This will be discussed below with respect to slots. According to some aspects, the rules or restrictions may include which task can start from another task. For example, there may be sometimes interdependencies between tasks, such as data that may be exchanged between tasks, data that may be computed by one task, but used by another task, and the like. Knowledge of these interdependencies may be used to make determinations and decisions of whether a particular task may be started from another task (e.g., a currently active task). According to some aspects, the rules or restrictions may include which task may be cancelled when another task is activated. For example, if a user inputs "Call Joe," and then the user changes his mind and says "Well, send him an email instead," a call task might need to be cancelled instead of being re-activated once the email is sent to Joe.

Figure 6:
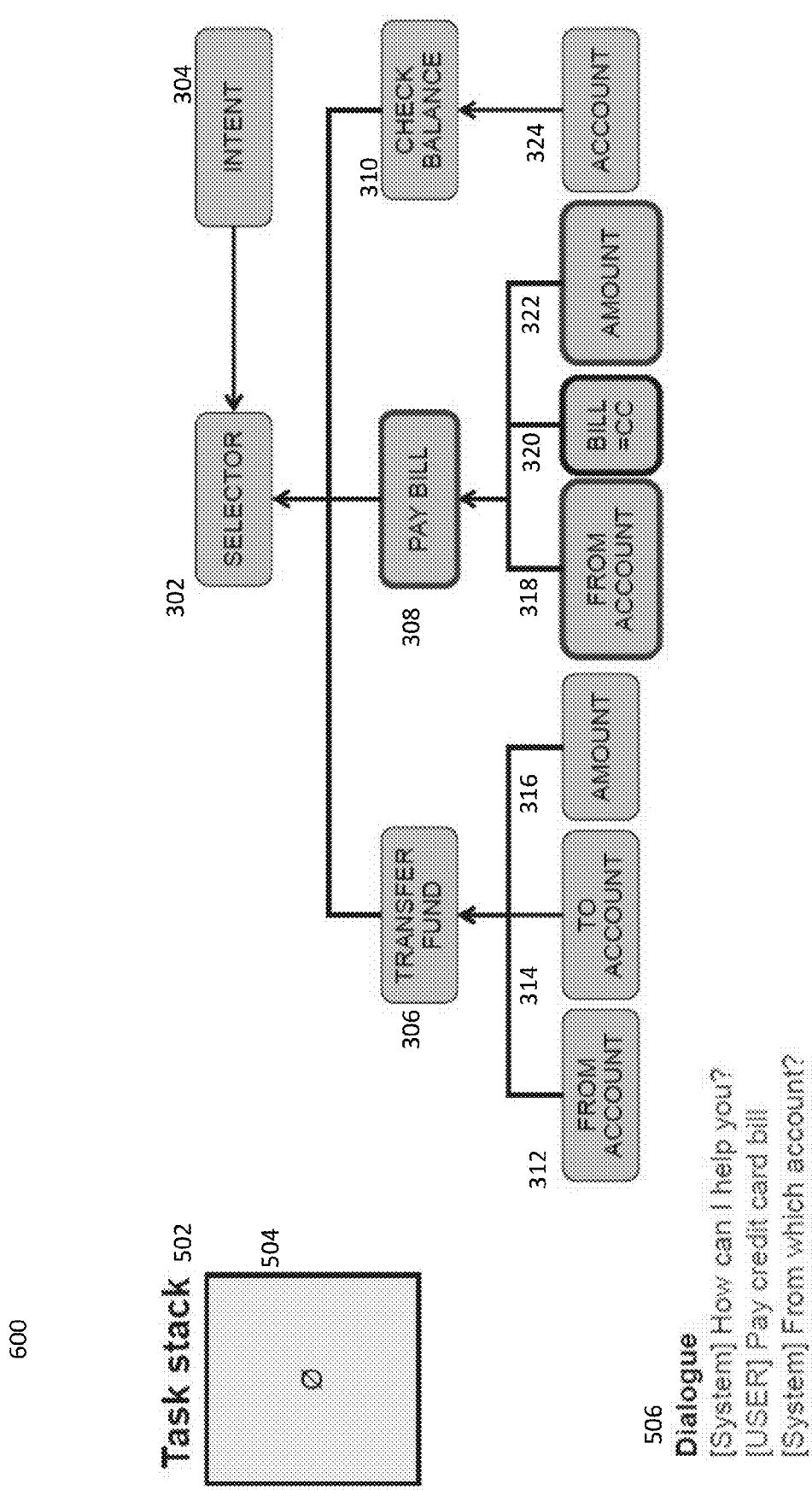
FIG. 6 depicts an illustrative diagram showing an example system in accordance with one or more features described herein.

FIG. 6 illustrates system 600, which may be substantially the same as system 300. System 600 may include a task stack 502, which may reside in a memory device. Task stack 502 may include one or more interrupted tasks. Thus, when a task is interrupted, that task may be placed in the task stack 502. As shown in FIG. 6, task stack 502 may include no current tasks (as illustrated with the closed group 504). Components of system 600 may be similar to and/or the same as components of system 3600, as shown in FIG. 36. According to some aspects, components of system 3600 may comprise components of system 600.

System 600 may be invoked in response to a dialogue input 506. As shown, system 600 may interact with a user (or other entity). For example, system 600 may ask the user "How can I help you?" System 600 may ask this question (e.g., interact with the user) via, for example, a user interface on the user client 102. The user may input into system 600 (e.g., via verbal speech, hand motions, typing, or any other way to input dialogue) the words "Pay credit card bill." The user may input these words via, for example, a user interface on the user client 102. System 600 may interpret this input as meeting a condition to activate the pay bill task 308. Selector 302 (e.g., via the intent slot 304) may then activate the pay bill task 308 and the bill agent 320. The bill agent 320 may then begin to collect information, such as the credit card information associated with the user (e.g., account information, credit card number, balance on credit card, linked accounts, authorized users, etc.). For example, system 600 may then ask the user "From which account?" Thus, system 600 may move between agents of the activated tasks until all of the agents have retrieved sufficient information to complete a goal. Thus, agent 318 may request account information by asking the question "From which account?"

Figure 7:
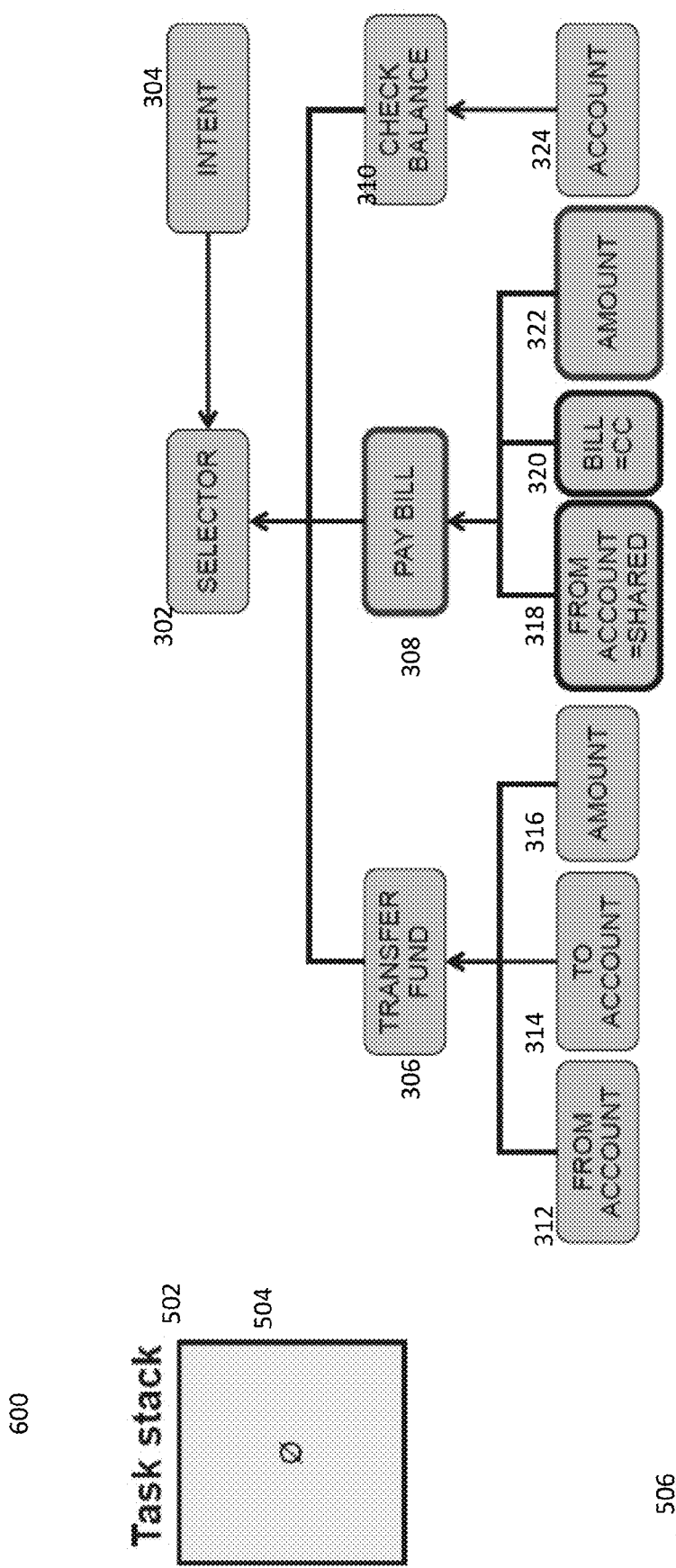
FIG. 7 depicts an illustrative diagram showing an example system in accordance with one or more features described herein.

FIG. 7 illustrates that in the dialog 506, system 600 may ask "From which account?" The user may respond with "Shared account." Thus, as shown in FIG. 7, agent 320 shows the bill to pay is the credit card bill, and the account to pay the credit card bill from is the shared account. Agent 322 may then request information by asking the question "How much do you want to pay?" Thus, according to some aspects, task 308 may stay active until the task is completed (e.g., until all its agents have obtained desired information) or until the task is interrupted (e.g., by another task, by a user cancellation, etc.).

Figure 8:
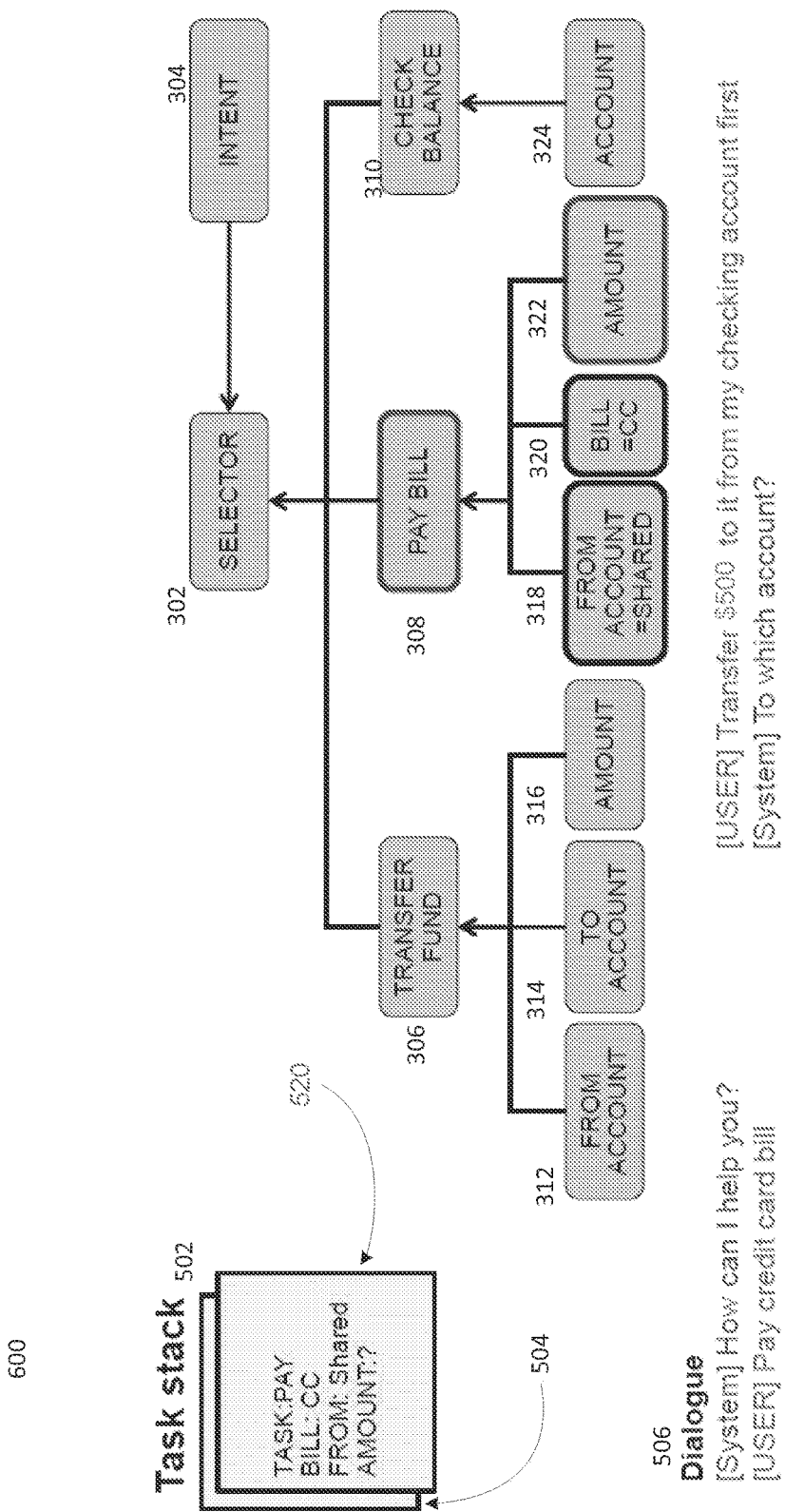
FIG. 8 depicts an illustrative diagram showing an example system in accordance with one or more features described herein.

FIG. 8 illustrates that in the dialog 506, the user may input "Transfer $500 to it from my checking account first." System 600 may then ask "To which account?" In such situations, the current pay bill task 308 may be interrupted, and the selector 302 may activate the transfer fund task 306. This may happen because a condition may satisfy the transfer fund task 306 (e.g., the condition of the intent to transfer money). As shown in task stack 502, the interrupted pay bill task 308 may be stacked as tab 520. Tab 520 may include information such as the task (e.g., the pay bill task 308), information collected by any agents (e.g., credit card bill, from the shared account, etc.), and the like.

Figure 9:
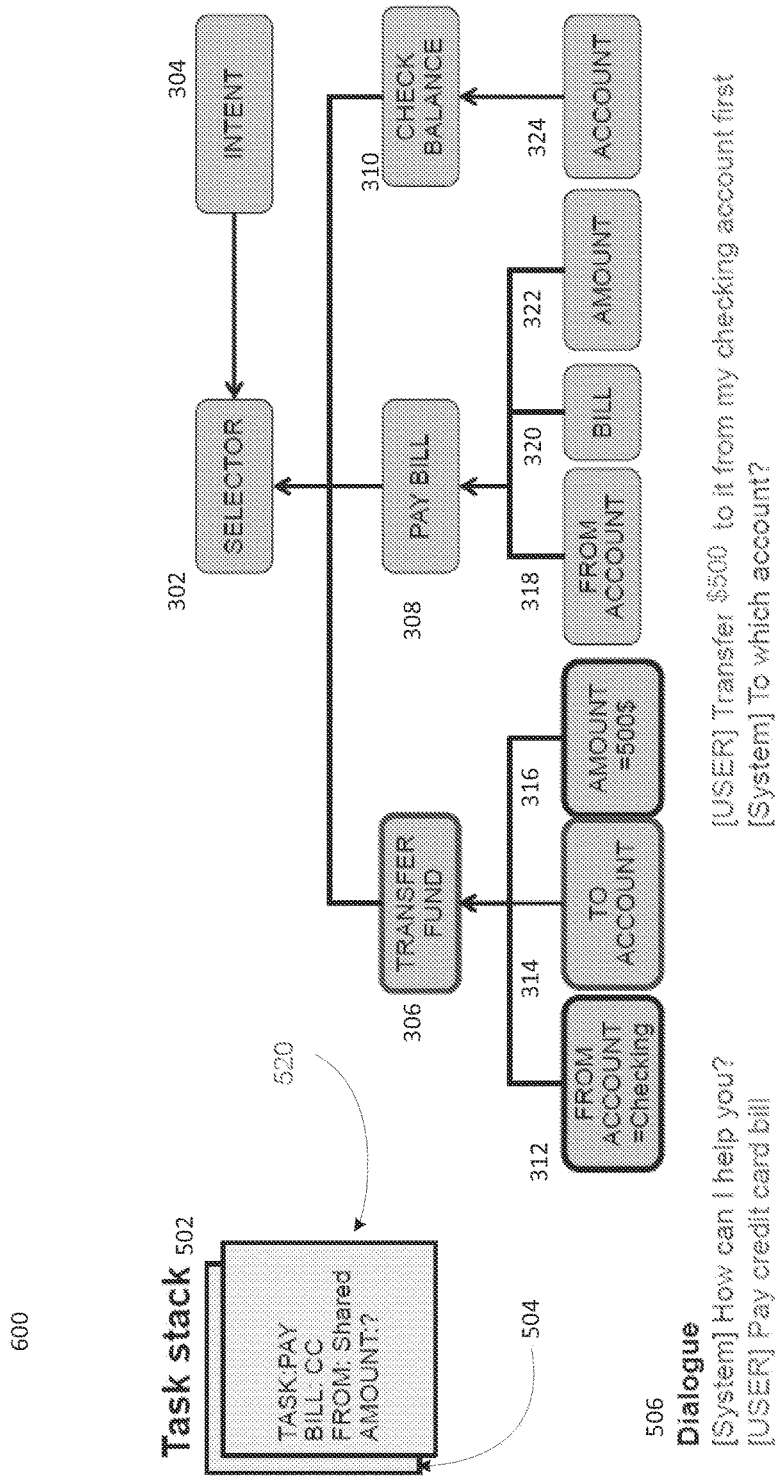
FIG. 9 depicts an illustrative diagram showing an example system in accordance with one or more features described herein.

FIG. 9 illustrates that task 306 may be activated, and its agents may begin to collect information from the user input. As shown, the agent 312 has determined that the money should be transferred from the checking account, and the agent 316 has determined that the amount to transfer is $500. Thus, agent 314 may request information, such as by asking the question "To which account?"

Figure 10:
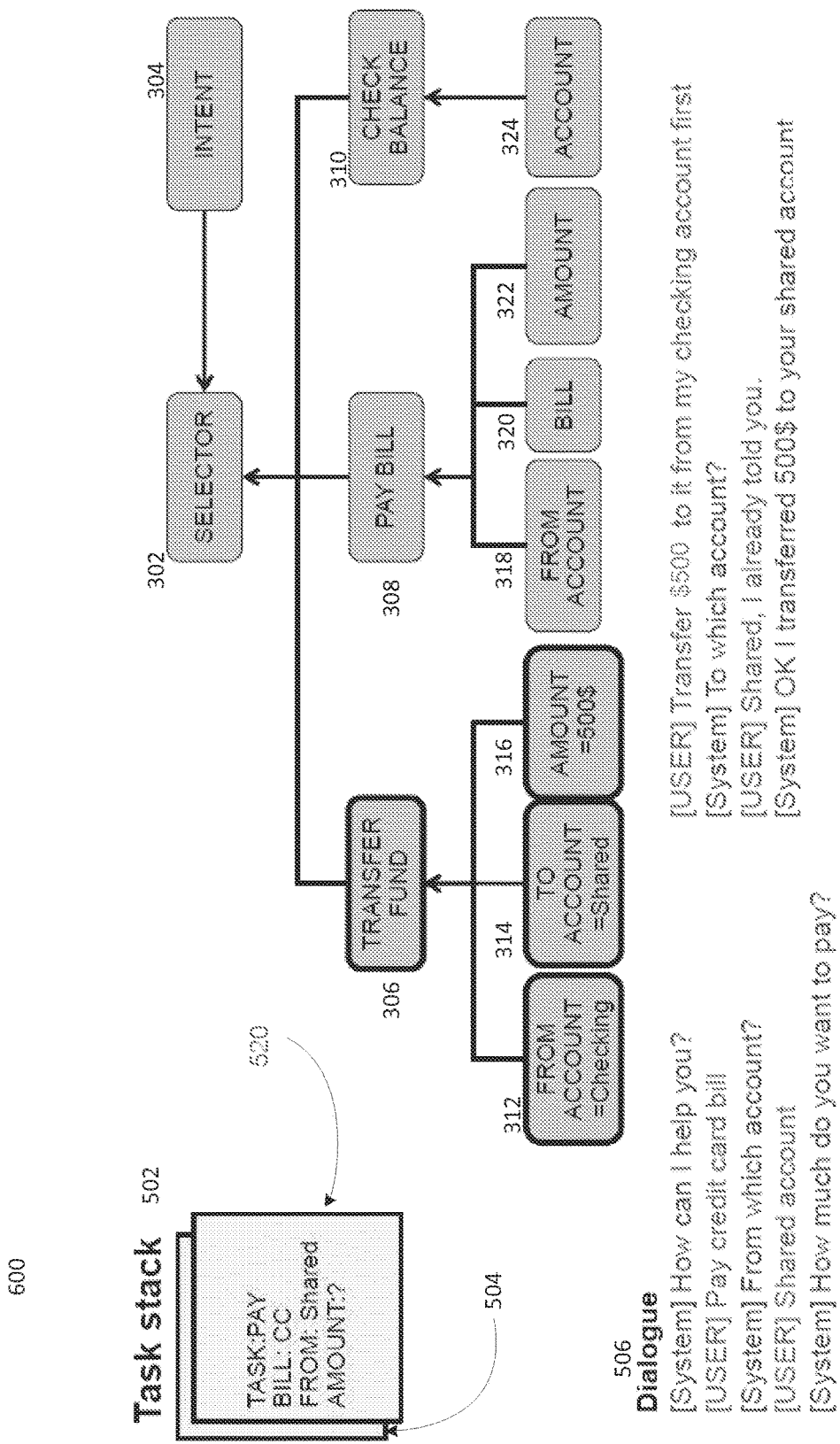
FIG. 10 depicts an illustrative diagram showing an example system in accordance with one or more features described herein.

FIG. 10 illustrates that in the dialog 506, the user may input "Shared, I already told you." The agent 314 may then determine that the account to transfer money to is the shared account. Having all three of its agents satisfied with the retrieved information, the transfer fund task 306 may be completed, and the system 600 may complete the processing related to task 306 by transferring $500 to the shared account from the checking account. System 600 may then state "OK I transferred $500 to your shared account."

According to some aspects, system 600 may be configured to access one or more information sources characterizing dialogue context, linguistic features, and/or NLU features to identify unresolved anaphora in the text words that need resolution in order to determine a semantic interpretation. According to some aspects, an anaphora processor may resolve an identified unresolved anaphora by associating it with a previous concept occurring in the text words.

Figure 11:
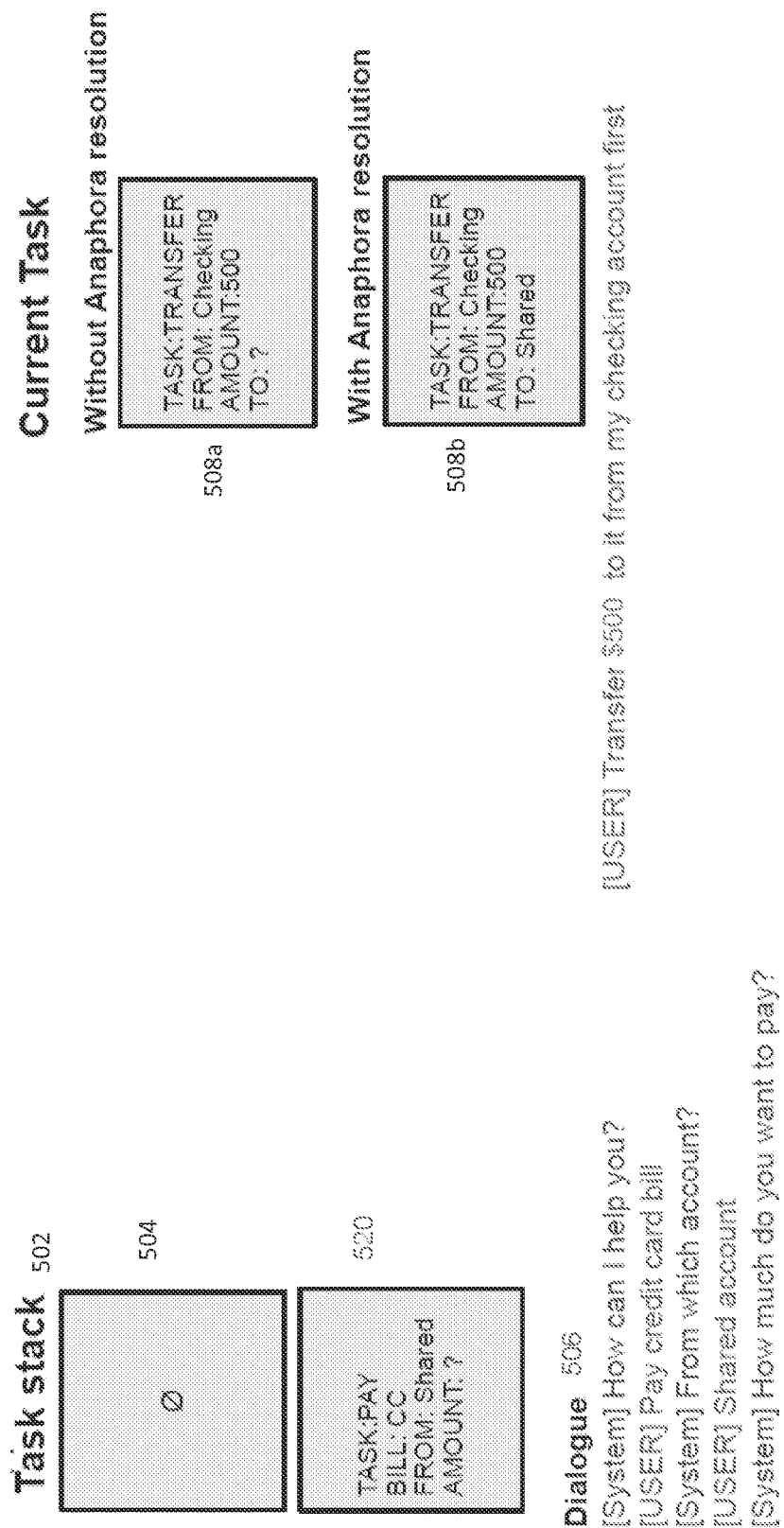
FIG. 11 depicts an illustrative diagram showing examples of using anaphora resolution and without using anaphora resolution in accordance with one or more features described herein.

For example, system 600 may use anaphora resolution in processing a user input. For example, FIG. 11 illustrates an example of how the input of "Transfer $500 to it from my checking account first" may be interpreted by system 600 using anaphora resolution and without using anaphora resolution. As shown, tab 508a may be a tab for the current transfer task 306 without system 600 using anaphora resolution. Because system 600 did not use anaphora resolution, system 600 might not know what the "it" refers to in the statement "Transfer $500 to it from my checking account first." Thus, a question mark may be placed next to the "TO:" field. Tab 508b may be a tab for the current transfer task 306 with system 600 using anaphora resolution. Because system 600 did use anaphora resolution, system 600 may know (or assign a value for) what the "it" refers to in the statement "Transfer $500 to it from my checking account first," based on the information stored/identified/listed in a tab (e.g., tab 520) for a previously active or interrupted task. Thus, "Shared" may be placed next to the "TO:" field.

Figure 12:
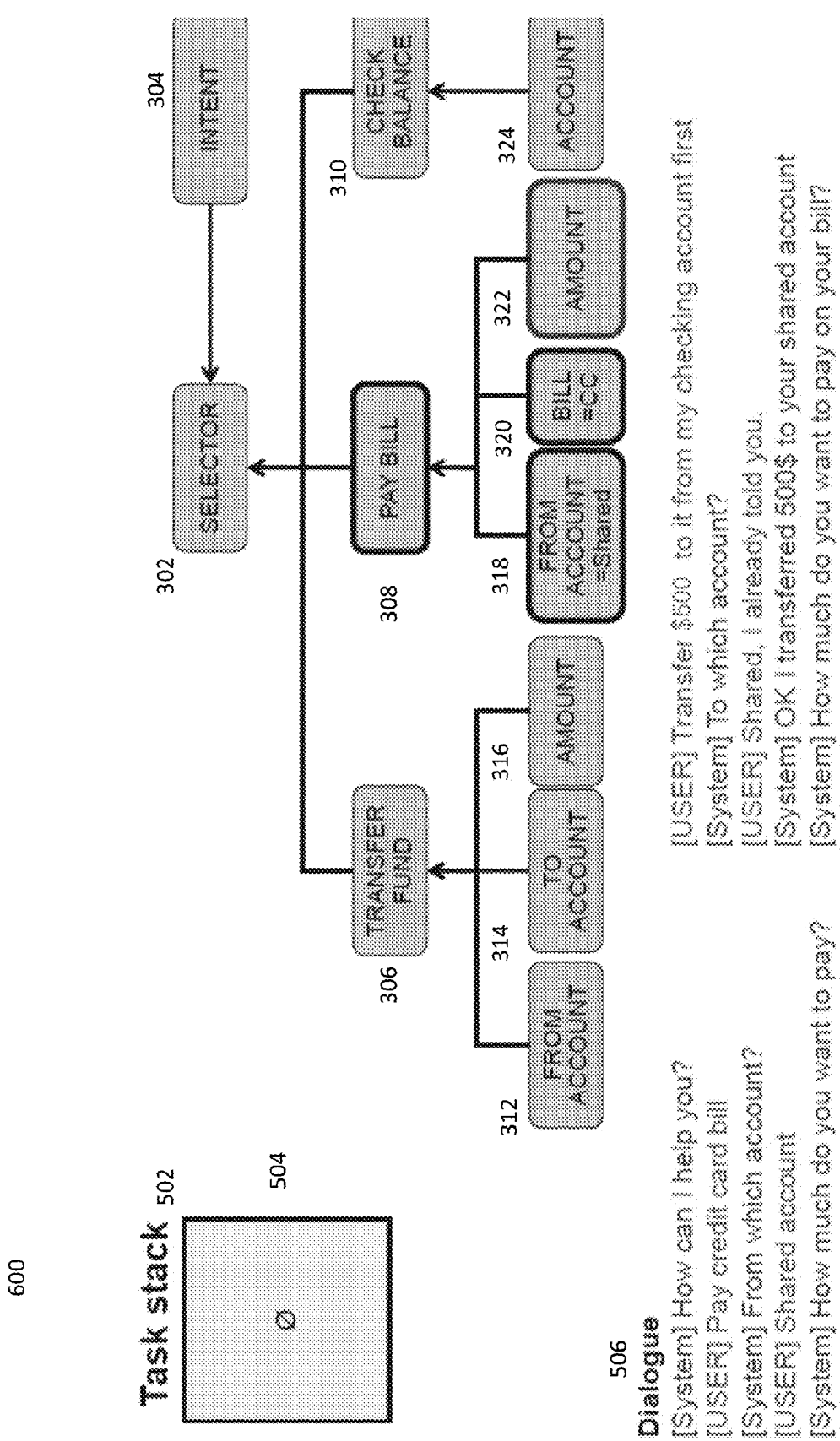
FIG. 12 depicts an illustrative diagram showing an example system in accordance with one or more features described herein.

FIG. 12 illustrates that after task 306 is complete, the system 600 may then unstack tab 520 and reactivate the task identified in tab 520 (e.g., task 308). As shown in the dialogue 506, the system 600 may ask "How much do you want to pay on your bill?" Thus, in this example, task 308 may continue right where it left off when task 306 interrupted task 308.

Figure 13:
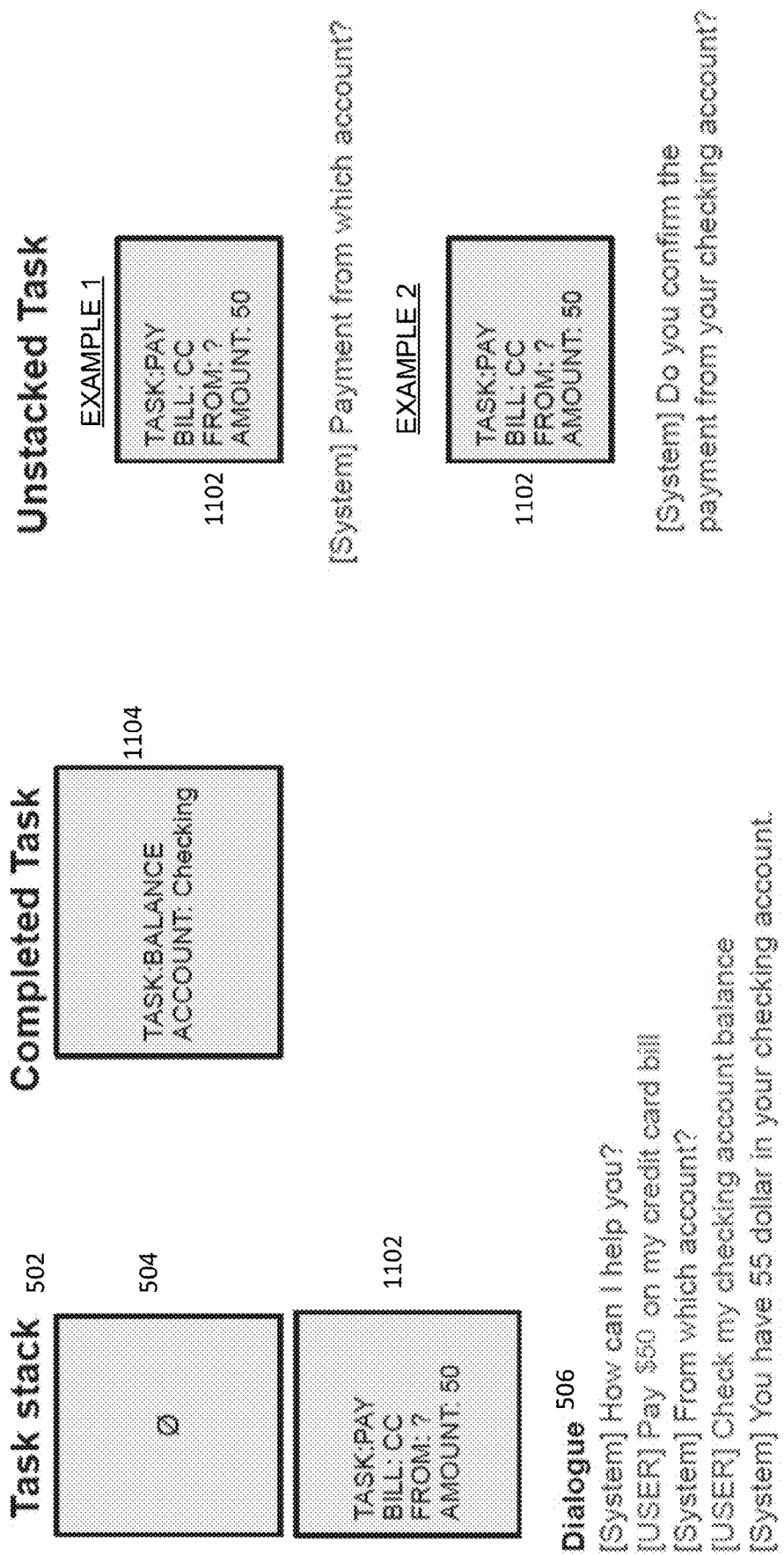
FIG. 13 depicts an illustrative diagram showing examples of continuing an unstacked task in accordance with one or more features described herein.

In some embodiments, the interrupted task (e.g., task 308 in this example) might not continue right where it left off when it was interrupted. FIG. 13 illustrates examples of how an unstacked task may be continued based on a previously completed task. For example, task stack 502 may include a tab 1102, which may indicate a pay task 308, and may also include to pay $50 on the user's credit card bill. Thus, the pay task 308 may be an interrupted task because it is on task stack 502. A current balance task 310 for determining the balance of the checking account may be just completed (shown by tab 1104). Dialog 506 illustrates this task flow. The system (e.g., system 600) may ask "How can I help you?" The user may input "Pay $50 on my credit card bill." The system may then ask "From which account?" The user may then input "Check my checking account balance." This may interrupt the pay task 308 (tab 1102) with a check balance task 310 (tab 1104). The system may complete task 310, and may state "You have $55 in your checking account." After task 310 is completed, the system may unstack tab 1102, and may continue where it left of by asking "Payment from which account?" Alternatively, the system may unstack tab 1102, and may ask, based on information from the previously completed task, "Do you confirm the payment from your checking account?" or may automatically pay the credit card bill from the checking account. The information used from the previously completed task may include, for example, the fact that the user just checked the balance of the user's checking account, the checked account has money in it, and the like.

FIG. 14 illustrates examples of how the order of stacked tasks (e.g., interrupted tasks) may be reactivated after a current task is completed. Dialogue 1402 may begin by having the system (e.g., system 600) state "How can I help you." The user may input "Pay credit card bill." The system may then activate a pay task (e.g., task 308) for the credit card bill. The system may ask "How much do you want to pay?" The user may input "Balance." The system may then activate a check balance task (e.g., task 310). The system may ask "For which account?" The user may then input "Pay $10 on cable bill from my checking account." The system may then activate a pay task for the cable bill (different than the pay task for the credit card bill). The system may complete the pay task for the cable bill, and may state "Paid." The system may then return to the task that immediately preceded the currently complete task. Thus, the system may return to the check balance task, and may ask "See balance for which account?" In the example of dialogue 1404, instead of returning to the task that immediately preceded the currently complete task, the system may return to a task that does not immediately precede the currently complete task, such as the pay task for the credit card bill. Thus, the system may ask "How much do you want to pay?" for the credit card bill. Thus, in some situations, the task stack may be first in, first out (FILO), such if a user desires to complete a stacked task, then all of the tasks stacked on top of that task may need to be completed before completing the desired stacked task. However, in other situations, a stacked task may be unstacked and activated based on a user input. For example, a user may state "Finish paying credit card bill." This input may retrieve a stacked pay task tab for paying the credit card bill.

In some embodiments, a task may be dropped, for example, based on a result/goal of a completed task or information retrieved from another task. For example, in dialogue 1404, the check balance task may be dropped because the system may determine that the user no longer desires to check the balance because the user has input a command to pay money from an account, thus demonstrating that the user may know he already has money in the checking account. According to some embodiments, information might not be added to a stacked task tab until the tab has been unstacked.

Figure 15:
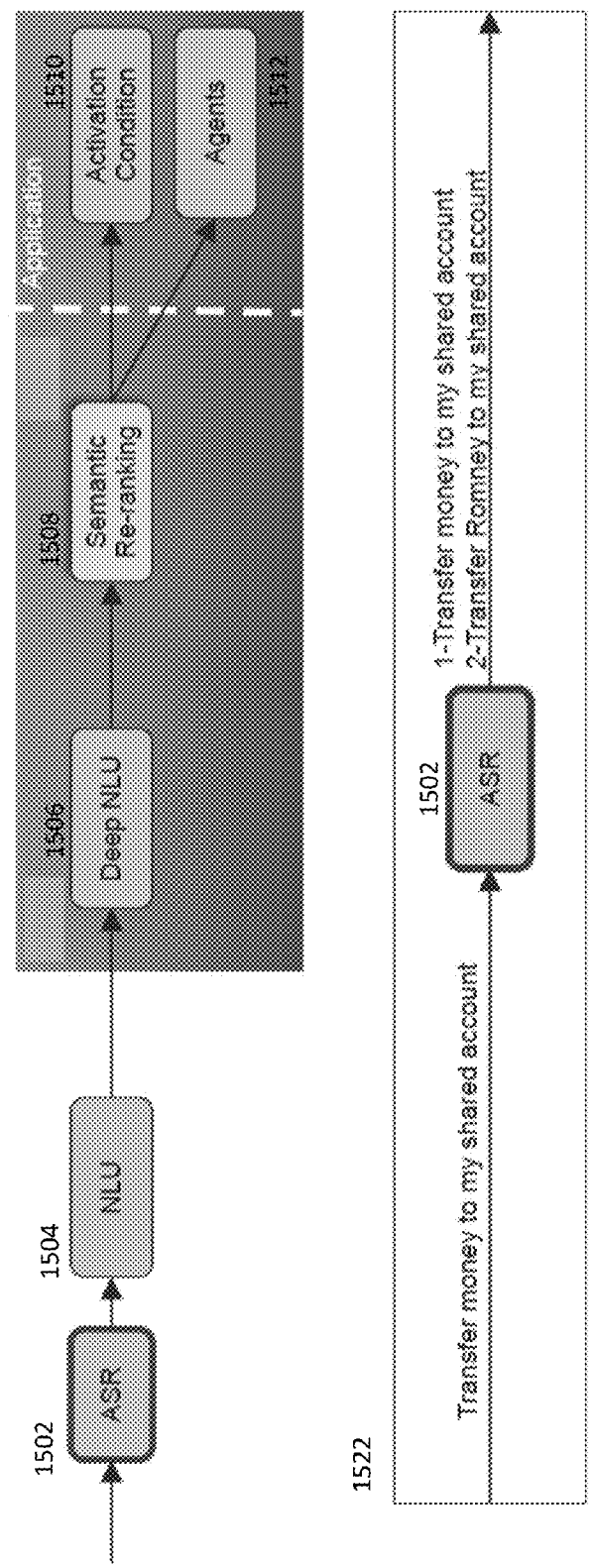
FIG. 15 depicts an illustrative diagram showing an example system in accordance with one or more features described herein.

FIG. 15 illustrates a system 1500, which may be a first configuration of system 100, and may contain features similar to and/or the same as system 100. For example, system 1500 may include an ASR engine 1502, a NLU engine 1504, a deep NLU engine 1506, a semantic re-ranking engine 1508, an activation condition engine 1510, and agents 1512. System 1500 may comprise, for example, system 600. The dialogue 1524 illustrates that system 1500 may ask "How can I help you?" and a user may input into system 1500 the words "Transfer money to my shared account." As shown in flow 1522, the ASR 1502 may then produce one or more transcriptions of the input. In this example, ASR 1502 might produce two transcription results from the initial input.

Figure 16:
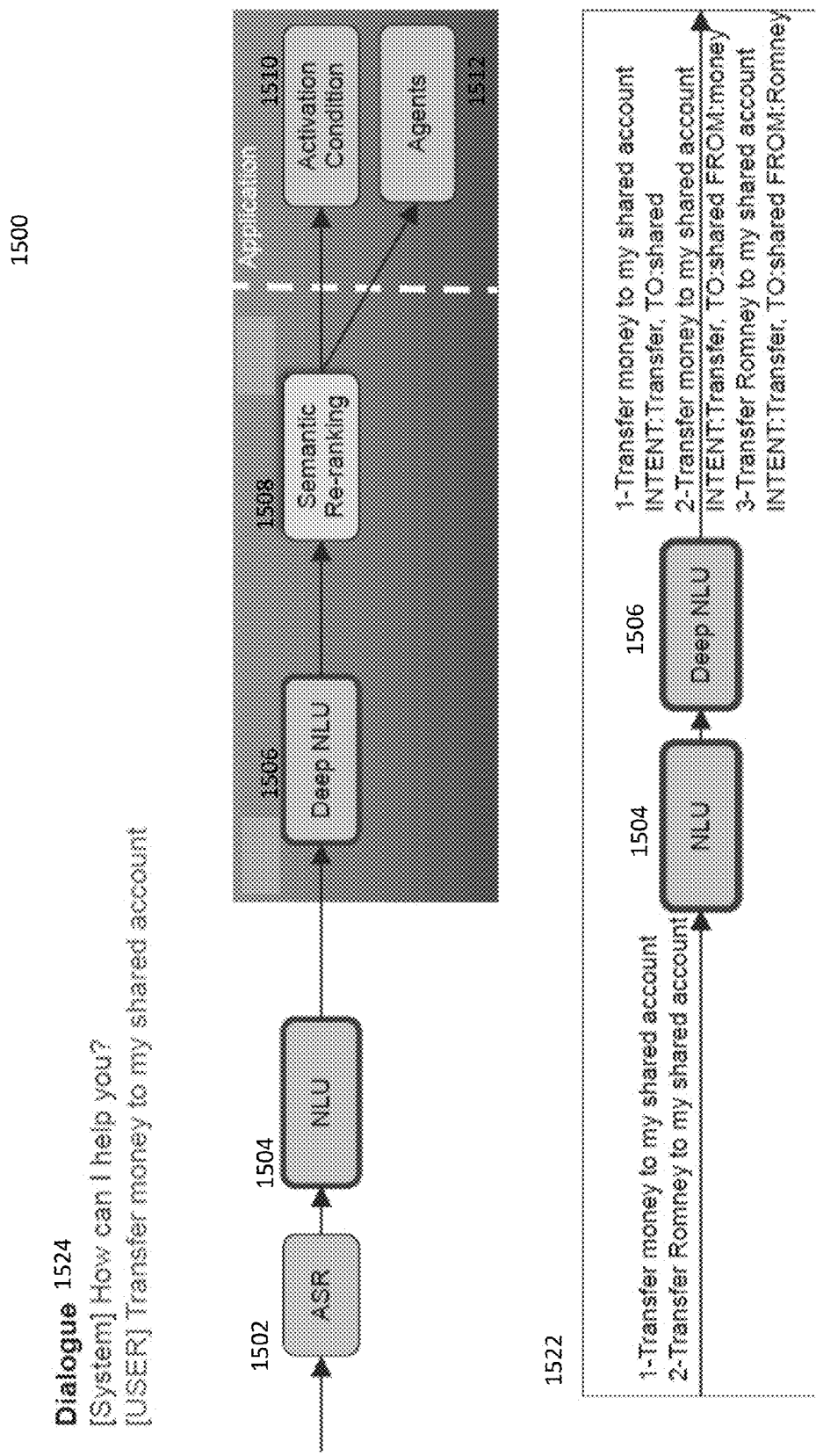
FIG. 16 depicts an illustrative diagram showing an example system in accordance with one or more features described herein.

In FIG. 16, the two transcriptions may be passed to the NLU 1504 (and/or deep NLU 1506). The NLU 1504 may then parse the transcriptions and produce one or more semantic interpretations by transcription. It is noted that deep NLU 1506 may also be used to produce semantic interpretations. In this example, three semantic interpretations may be produced. These semantic interpretations may include one or more of an "INTENT" field (e.g., intent to transfer), a "TO" field (e.g., transfer to the shared account), and a "FROM" field (e.g., from a money or Romney account).

Figure 17:
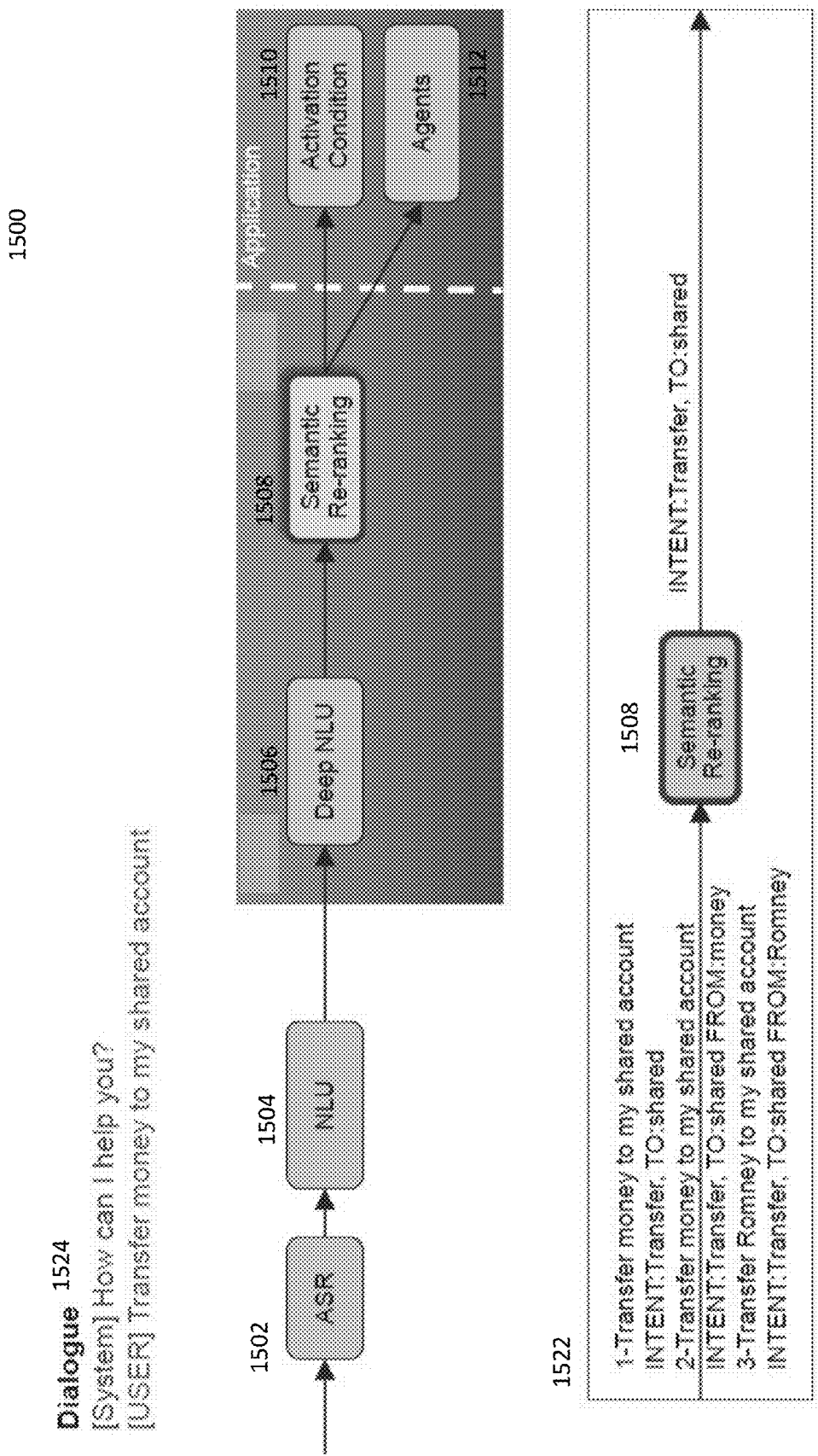
FIG. 17 depicts an illustrative diagram showing an example system in accordance with one or more features described herein.
Figure 18:
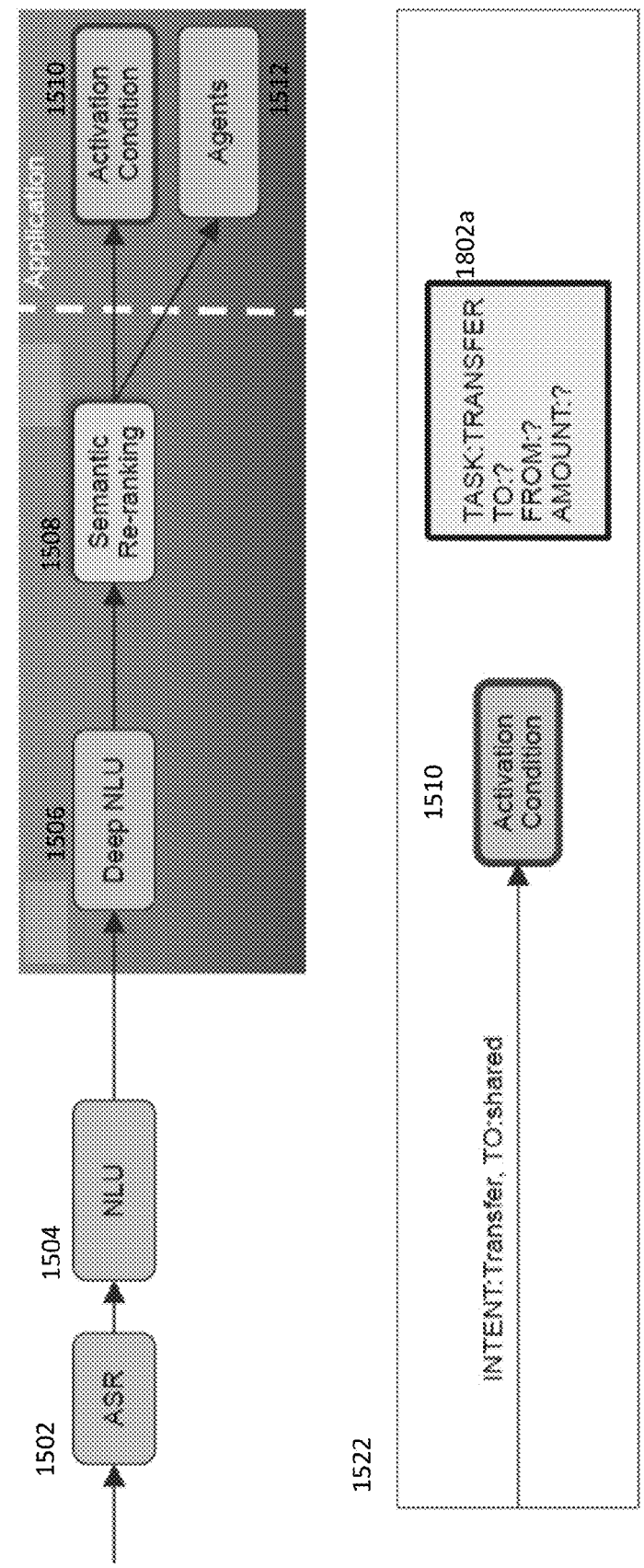
FIG. 18 depicts an illustrative diagram showing an example system in accordance with one or more features described herein.
Figure 19:
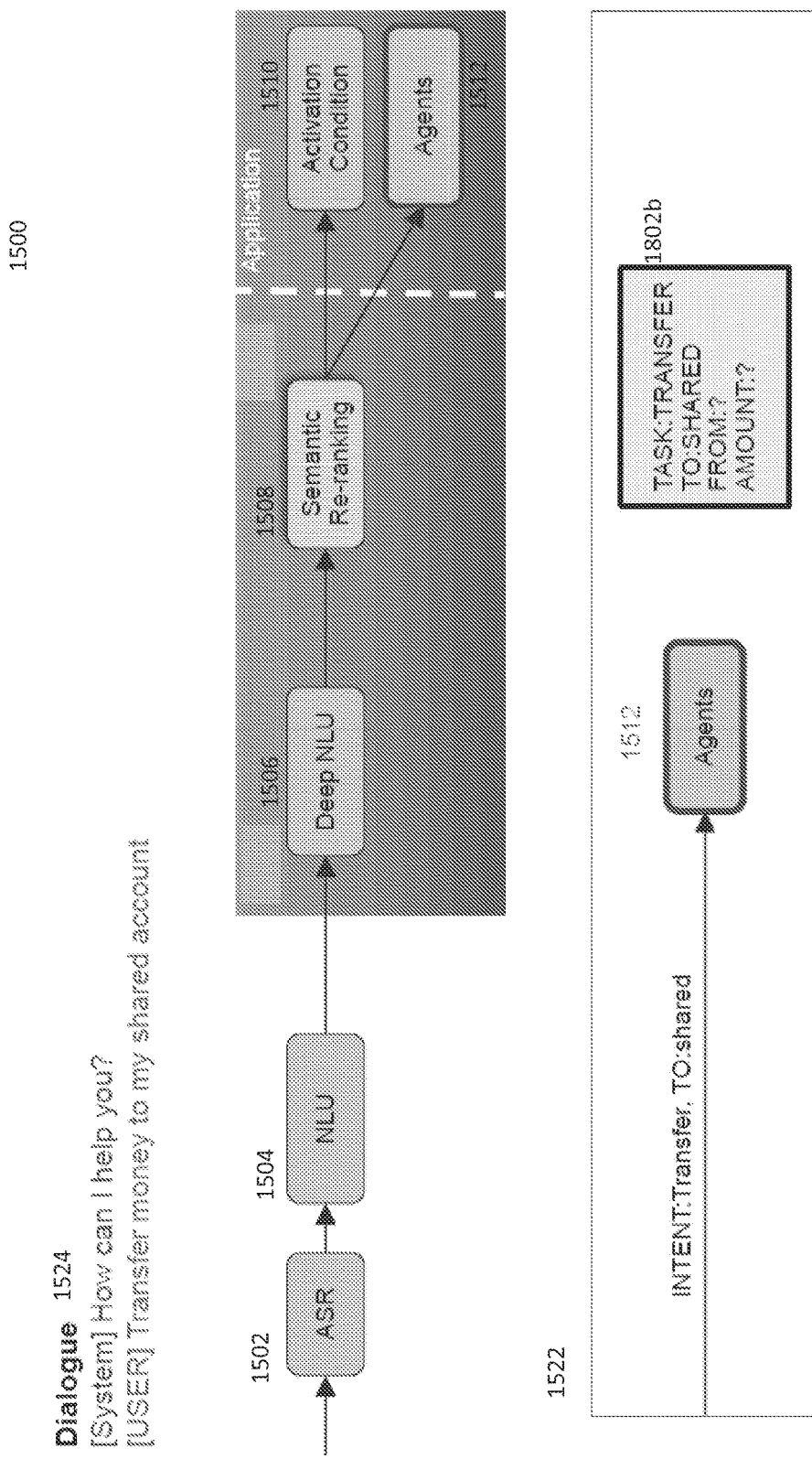
FIG. 19 depicts an illustrative diagram showing an example system in accordance with one or more features described herein.

In FIG. 17, the semantic re-ranking engine 1508 may select an interpretation based on grammar, context, and the like. In FIG. 18, the activation condition engine 1510 may activate the transfer task (e.g., task 306), which may be illustrated by tab 1802a. In FIG. 19, an activated agent 1512 (e.g., agent 314) may capture information from the selected interpretation. Here, the agent 1512 may determine that the account to transfer money to is the shared account, which may be illustrated by tab 1802b.

Figure 20:
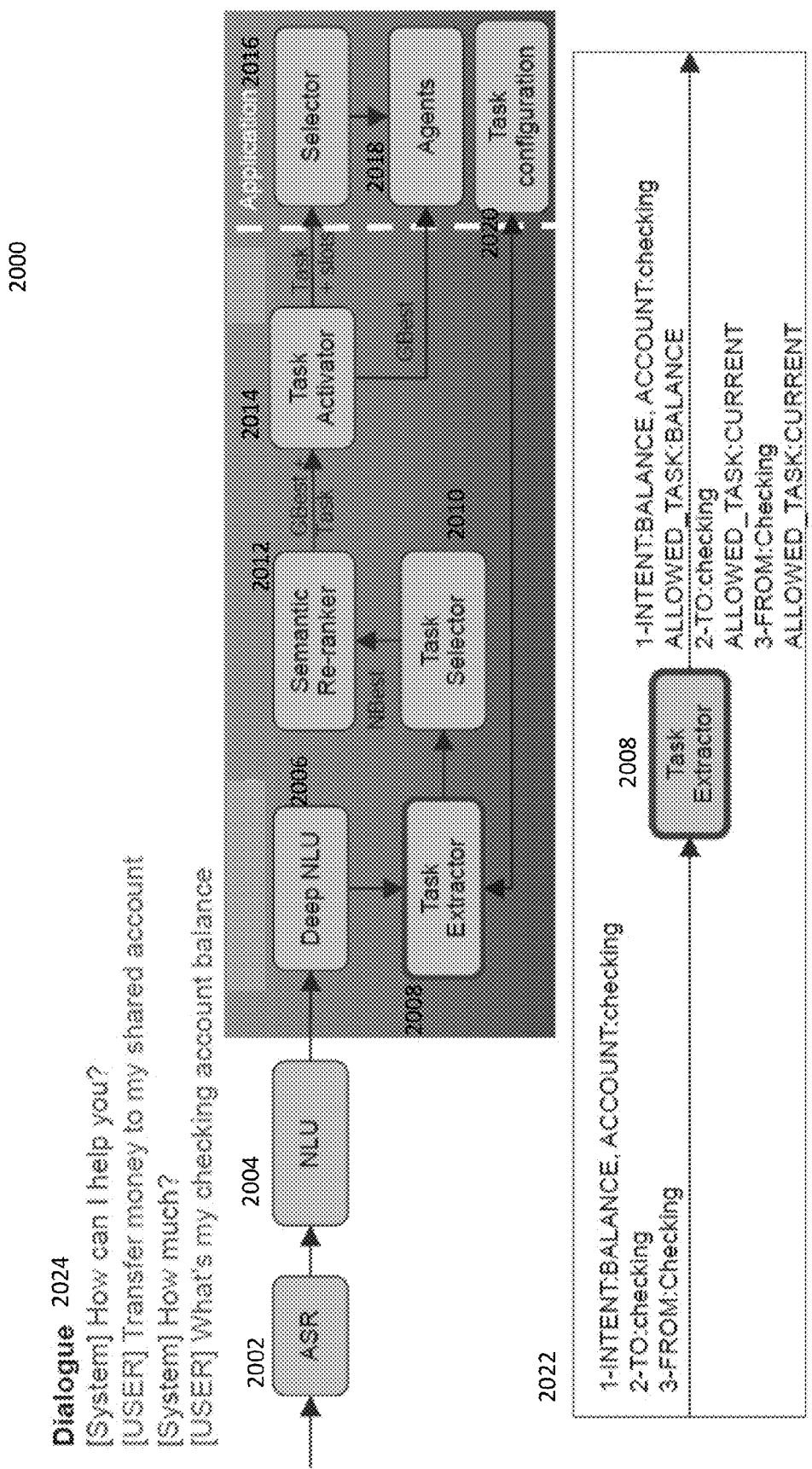
FIG. 20 depicts an illustrative diagram showing an example system in accordance with one or more features described herein.

FIG. 20 illustrates a system 2000, which may be a second configuration of system 100, and may contain features similar to and/or the same as system 100. For example, system 2000 may include an ASR engine 2002, a NLU engine 2004, a deep NLU engine 2006, a task extractor 2008, a task selector 2010, a semantic re-ranker engine 2012, a task activator engine 2014, a selector 2016, agents 2018, and a task configuration engine 2020. System 2000 may comprise, for example, system 600. The task switching configuration engine 2020 may be used to enable/disable task switching, and may be similar to configuration engine 326. According to some aspects, a dialogue application (shown by "Application" in FIG. 20) may comprise the selector 2016, agents 2018, and task switching configuration engine 2020. Components of system 2000 may be similar to and/or the same as components of system 3600, as shown in FIG. 36. According to some aspects, components of system 3600 may comprise components of system 2000.

System 2000 may be used for a second input of words. For example, dialogue 2024 may indicate (as was discussed with respect to FIGS. 15-17) that the system may ask "How can I help you?" and the user has input "Transfer money to my shared account." Thus, a transfer task (e.g., task 306) may be activated by system 2000. The system 2000 may then ask "How much?" The user may then state "What's my checking account balance?" Thus, a check balance task (e.g., task 310) may be activated. Hence, in this example, the initial transfer task (e.g., task 306) may be interrupted by and/or switched to the check balance task (e.g., task 310). FIG. 20 may begin, for example, after the NLU 2004 and/or deep NLU 2006 might have produced one or more semantic interpretations for the input of "What's my checking account balance." As shown in FIG. 20, three semantic interpretations may be passed to the task extractor engine 2008. The task extractor engine 2008 may then find information for each task relative to an interpretation. For example, the task extract engine 2008 may determine which tasks may be implemented for each semantic interpretation, and may indicate this by generating an "allowed task" field. Thus, for the first interpretation, the allowed task may be "balance," because the intent condition may indicate balance. For the second and third interpretations, the allowed task may be the current task, because there is no intent condition provided, thus the only task condition that may be satisfied may be the current task.

Figure 21:
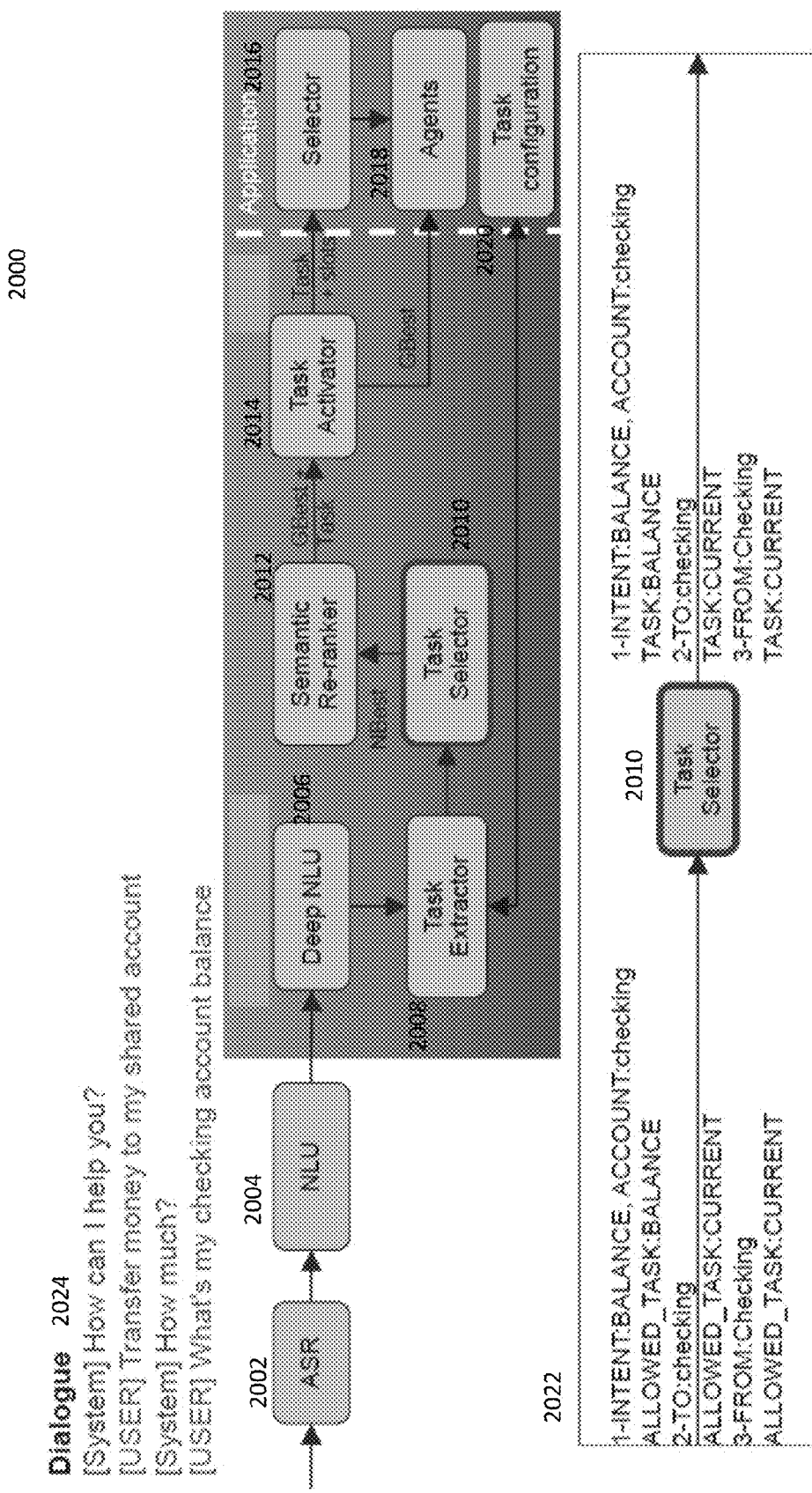
FIG. 21 depicts an illustrative diagram showing an example system in accordance with one or more features described herein.

In FIG. 21, the output from the task extractor 2008 may be passed to the task selector 2010, which may select a task for each interpretation based on grammar, anaphora, context, and the like. In this example, there is only one task for each interpretation. However, in some situations, the task extractor 2008 may generate more than one allowed task for an interpretation.

Figure 22:
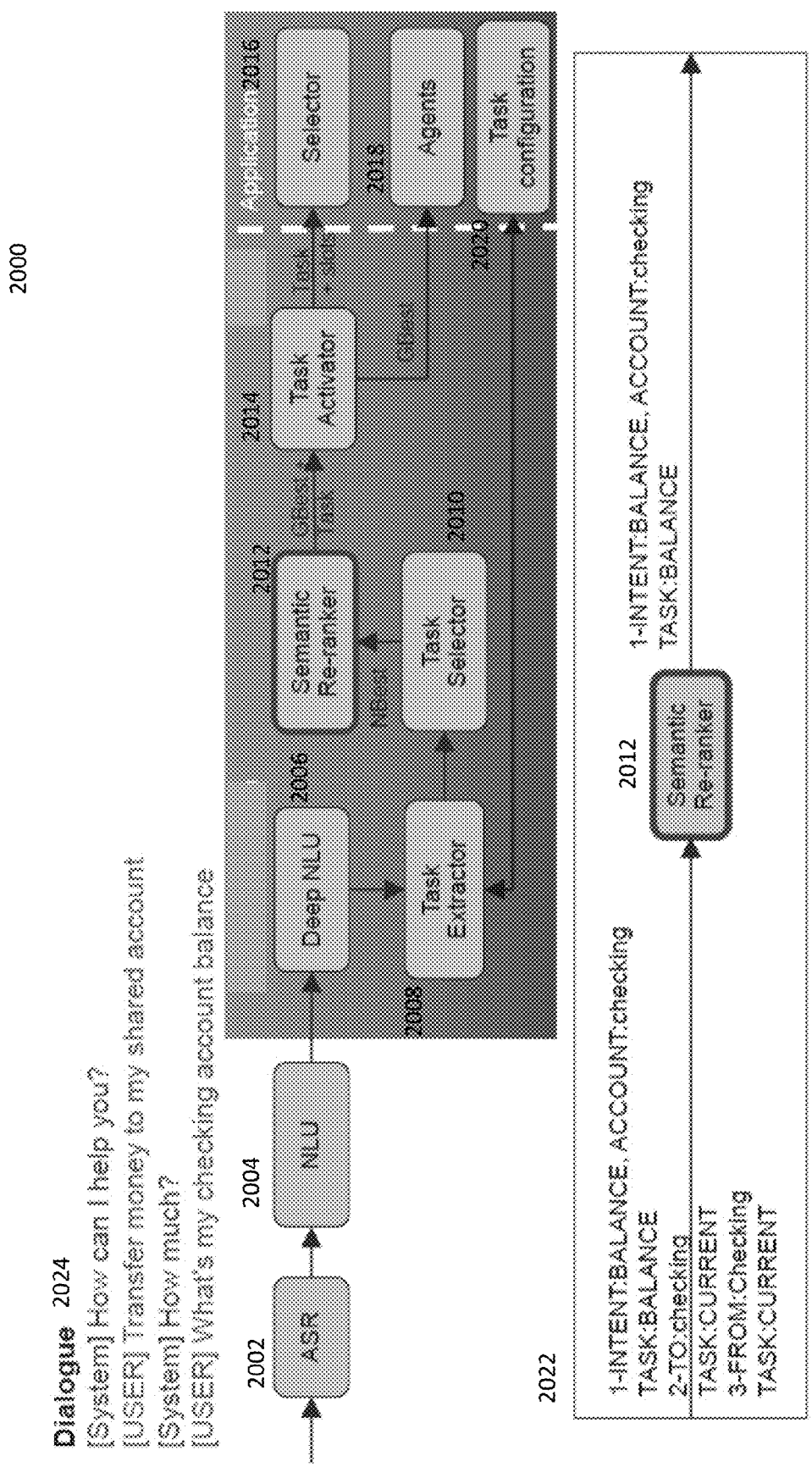
FIG. 22 depicts an illustrative diagram showing an example system in accordance with one or more features described herein.

In FIG. 22, the output (e.g., the interpretations and their associated task) from the task selector 2010 may be passed to the semantic re-ranker 2012. The re-ranker 2012 may then determine the interpretation with the highest score based on grammar, anaphora, context, and the like.

Figure 23:
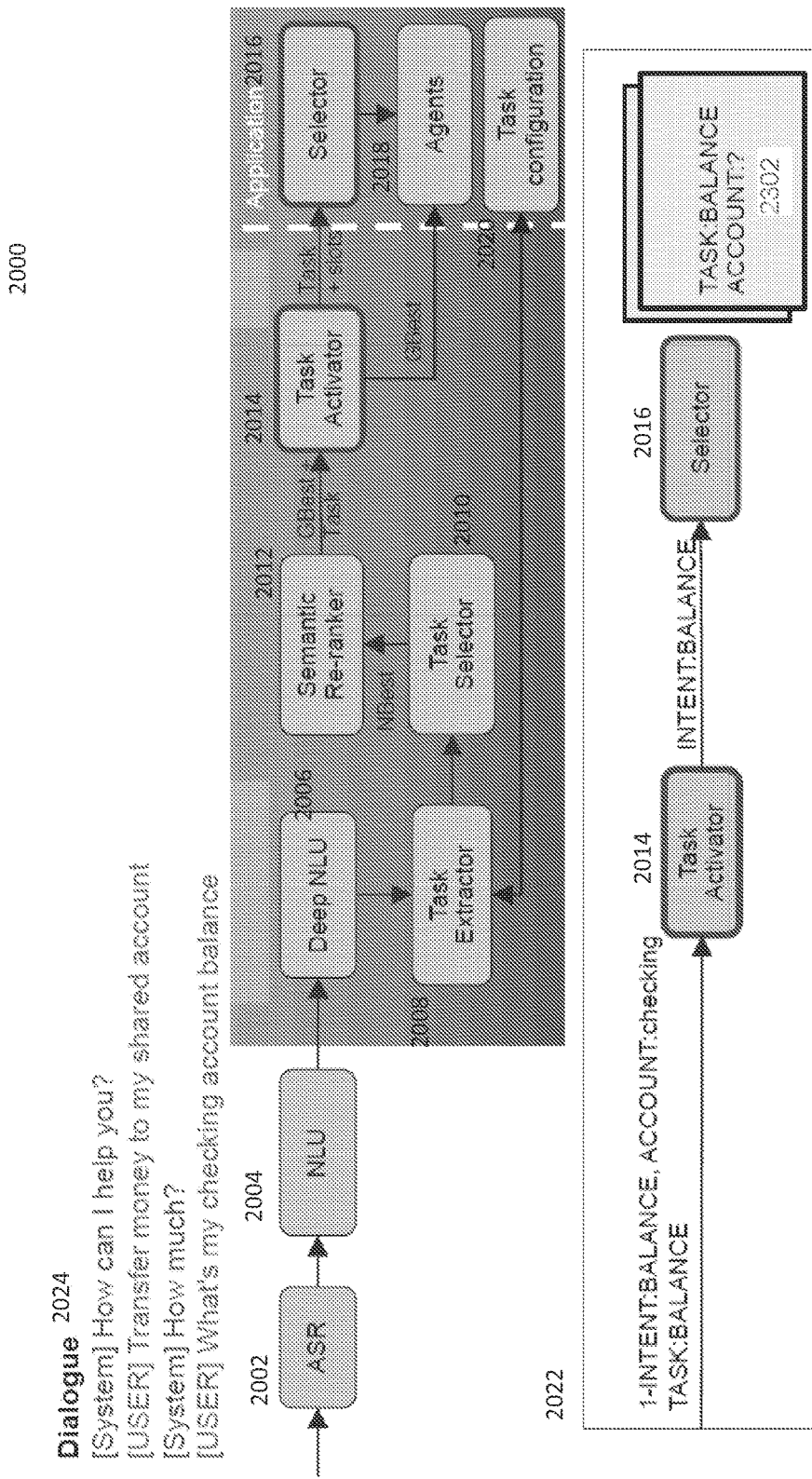
FIG. 23 depicts an illustrative diagram showing an example system in accordance with one or more features described herein.

In FIG. 23, the selected interpretation (and its associated task) may then be passed to the task activator 2014. The task activator 2014 may then stack the old task (e.g., the transfer task), and may activate the new task (e.g., the check balance task) by sending the relevant slots (e.g., slot 304) to the selector 2016 (e.g., selector 302). In this example, the slots may be the intent of checking the balance. The selector 2016 may then activate the task and the corresponding agents 2018. The new task may be shown by tab 2302.

Figure 24:
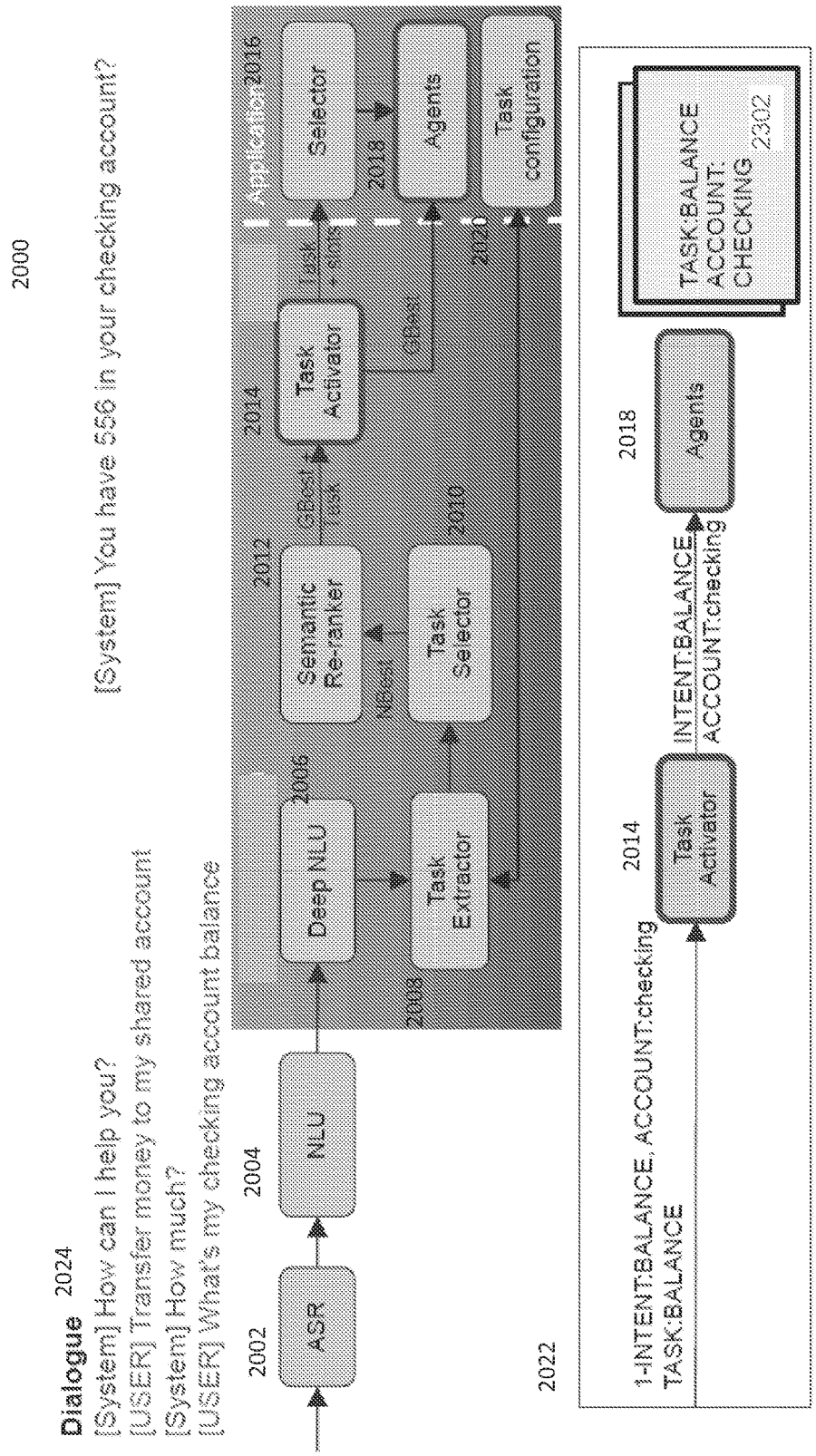
FIG. 24 depicts an illustrative diagram showing an example system in accordance with one or more features described herein.

In FIG. 24, task activator 2014 may then send information from the interpretation (shown by GBest in FIG. 24) to the activated task's agents 2018 so these agents may gather information from the interpretation. As shown in FIG. 24, the task activator 2014 may pass to the agents 2018 information showing that the account to check the balance of is the checking account. After receiving and processing this information, tab 2302 may be updated accordingly. Because the balance task (e.g., task 310) has only one agent (e.g., the account agent 324), all of the agents for the balance task have gathered information, and thus, the task may be processed and completed by system 2000. Thus, the dialogue 2024 may indicate that the system 2000 may state "You have $556 in your checking account."

Figure 25:
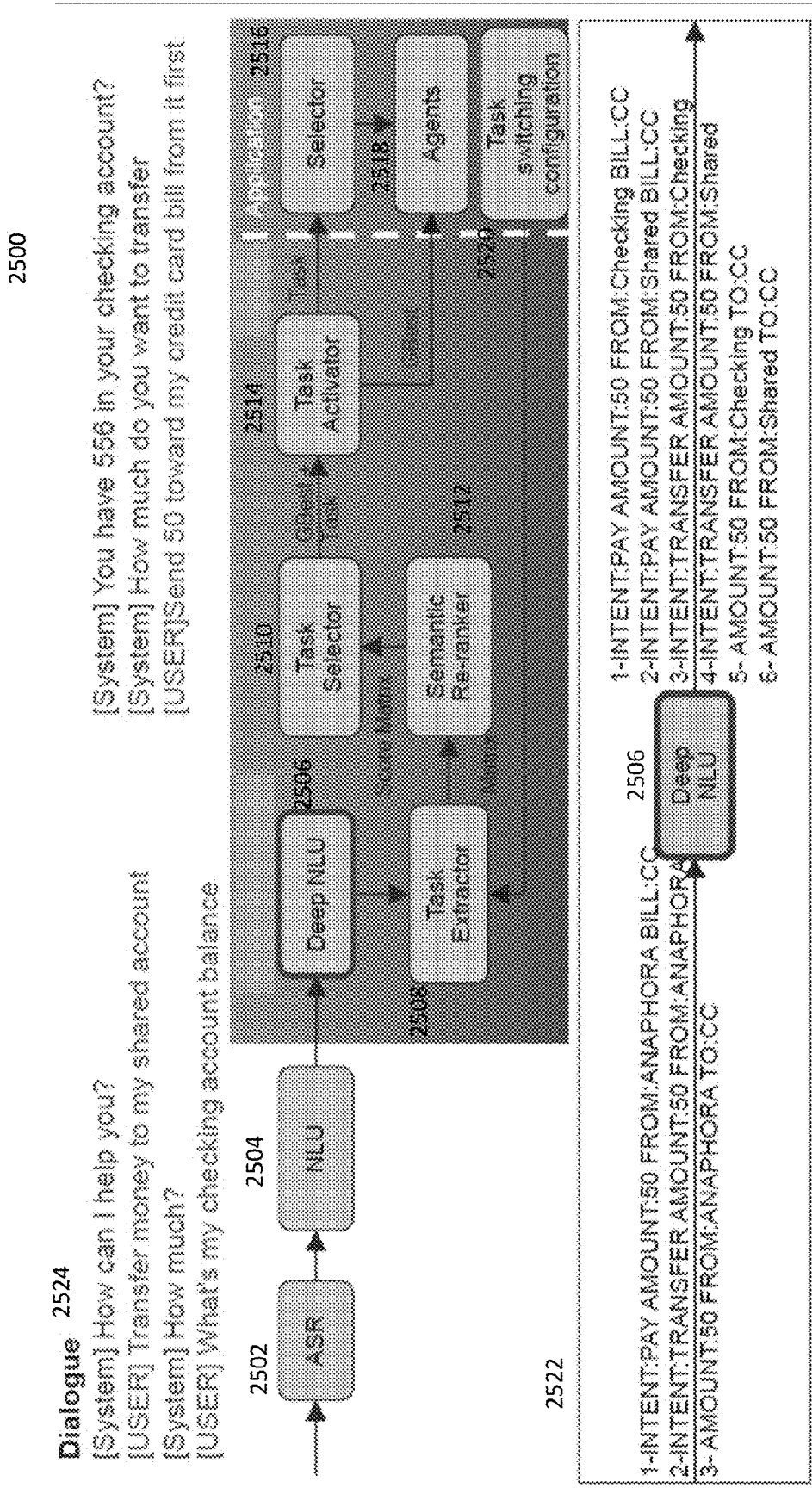
FIG. 25 depicts an illustrative diagram showing an example system in accordance with one or more features described herein.

It is noted that in the above example(s), system 2000 was used for a second input of words. In other embodiments and examples, system 2000 may be used for an input subsequent to a second input of words or for an initial input of words FIG. 25 illustrates a system 2500, which may be a third configuration of system 100, and may contain features similar to and/or the same as system 100. For example, system 2500 may include an ASR engine 2502, a NLU engine 2504, a deep NLU engine 2506, a task extractor 2508, a task selector 2510, a semantic re-ranker engine 2512, a task activator engine 2514, a selector 2516, agents 2518, and a task configuration engine 2520. The task switching configuration engine 2520 may be used to enable/disable task switching, and may be similar to configuration engine 326. According to some aspects, a dialogue application (shown by "Application" in FIG. 25) may comprise the selector 2516, agents 2518, and task switching configuration engine 2520. System 2500 may comprise, for example, system 600. Components of system 2500 may be similar to and/or the same as components of system 3600, as shown in FIG. 36. According to some aspects, components of system 3600 may comprise components of system 2500.

System 2500 may be used for a third input of words. For example, the dialogue 2524 may indicate (as was discussed with respect to FIGS. 15-17) that the system may ask "How can I help you?" and the user has input "Transfer money to my shared account." Thus, a transfer task (e.g., task 306) may be activated by system 2500. The system 2500 may then ask "How much?" The user may then state "What's my checking account balance?" Thus, a check balance task (e.g., task 310) may be activated. Hence, in this example, the initial transfer task (e.g., task 306) may be interrupted by and/or switched to the check balance task (e.g., task 310). The dialogue 2524 may indicate (as was discussed with respect to FIGS. 20-24) that the system may respond with "You have $556 in your checking account." The system may then unstack the previous transfer task, and may ask "How much do you want to transfer?" The user may then input "Send 50 toward my credit card bill from it first." Thus, system 2500 may determine whether the task needs to switched and/or interrupted or to continue with the current task.

FIG. 25 may begin, for example, after the NLU 2504 might have produced one or more semantic interpretations for the input of "Send 50 toward my credit card bill from it first." As shown in FIG. 25, there may be three semantic interpretations produced by NLU 2504 and passed to the deep NLU 2506. It is noted that each interpretation produced by NLU 2504 in FIG. 25 includes "ANAPHORA" for one of the fields in each interpretation. The inclusion of "ANAPHORA" may, for example, be a consequence of the user input including the word "it." As was discussed above, anaphora resolution may be used to determine to what "it" refers. Deep NLU 2506 may further process the interpretations using anaphora resolution, and may produce additional interpretations for each of the interpretations output by NLU 2502. Accordingly, for the first interpretation input into the deep NLU 2506, the deep NLU 2506 may determine that the anaphora for the "FROM" field may be the checking account or the shared account. For the second interpretation input into the deep NLU 2506, the deep NLU 2506 may determine that the anaphora for the "FROM" field may be the checking account or the shared account. For the third interpretation input into the deep NLU 2506, the deep NLU 2506 may determine that the anaphora for the "FROM" field may be the checking account or the shared account.

Figure 26:
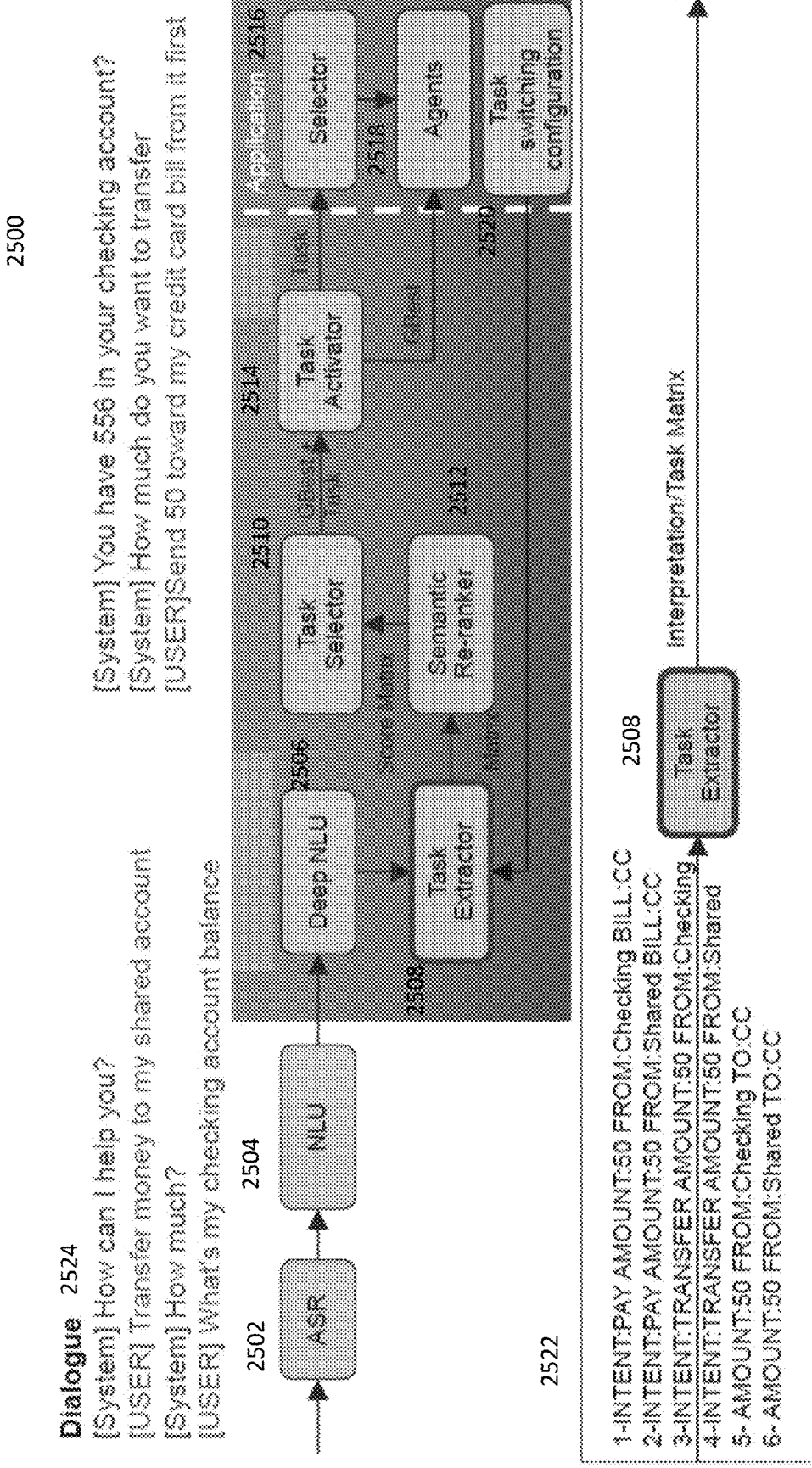
FIG. 26 depicts an illustrative diagram showing an example system in accordance with one or more features described herein.

In FIG. 26, the output from the deep NLU 2506 may be passed to the task extractor 2508. The task extractor 2508 may then create one or more entries corresponding to each interpretation output by the deep NLU 2506 and to the tasks supported by system 2500 and/or the dialogue application. According to some aspects, these entries may be organized into a matrix.

FIG. 27 illustrates an example matrix 2700a in which the entries may be organized. Matrix 2700a may include a column 2702 for interpretations 2706a-2706f, where each interpretation 2706a-2706f may correspond to a row of the matrix. Matrix 2700a may include a row of tasks 2708a-2708d supported by the system (e.g., system 2500) and/or supported by the dialogue application, where each task 2708a-2708d may correspond to a column of the matrix. According to some aspects, the supported tasks may include new instances of the supported task (e.g., "NEW TRANSFER", "NEW PAY BILL", and "NEW BALANCE"). According to some aspects, the supported task may also include an instance of the current task (e.g., "CONTINUE TRANSFER" in this example). Each entry 2710a-2710x may be a cell of the matrix that may correspond to one of the interpretations 2706a-2706f and to one of the supported tasks 2708a-2708d. For example, entry 2710f may correspond to both the interpretation of "INTENT: PAY, AMOUNT: 50, FROM: SHARED, BILL: CC" and to the task of "NEW PAY BILL". According to some aspects, the number of interpretations in column 2702 may be less than or greater than the amount of interpretations provided by NLU 2504 or deep NLU 2506. According to some aspects, the number of tasks in row 2704 may be less than or greater than the number of supported tasks or the number of supported tasks plus the currently active tasks. For example, the number of tasks included in row 2704 may be the number of tasks supported plus the number of active tasks.

FIG. 28 illustrates an example matrix 2700b that may include a determination made by the task extractor 2508 of whether a task is allowed or refused (e.g., not allowed) for each interpretation. According to some embodiments, the task extractor 2508 may base the determination of whether a task is allowed or refused based on the information contained in the interpretation (e.g., INTENT, ACCOUNT, etc.), context, grammar, and the like.

Figure 29:
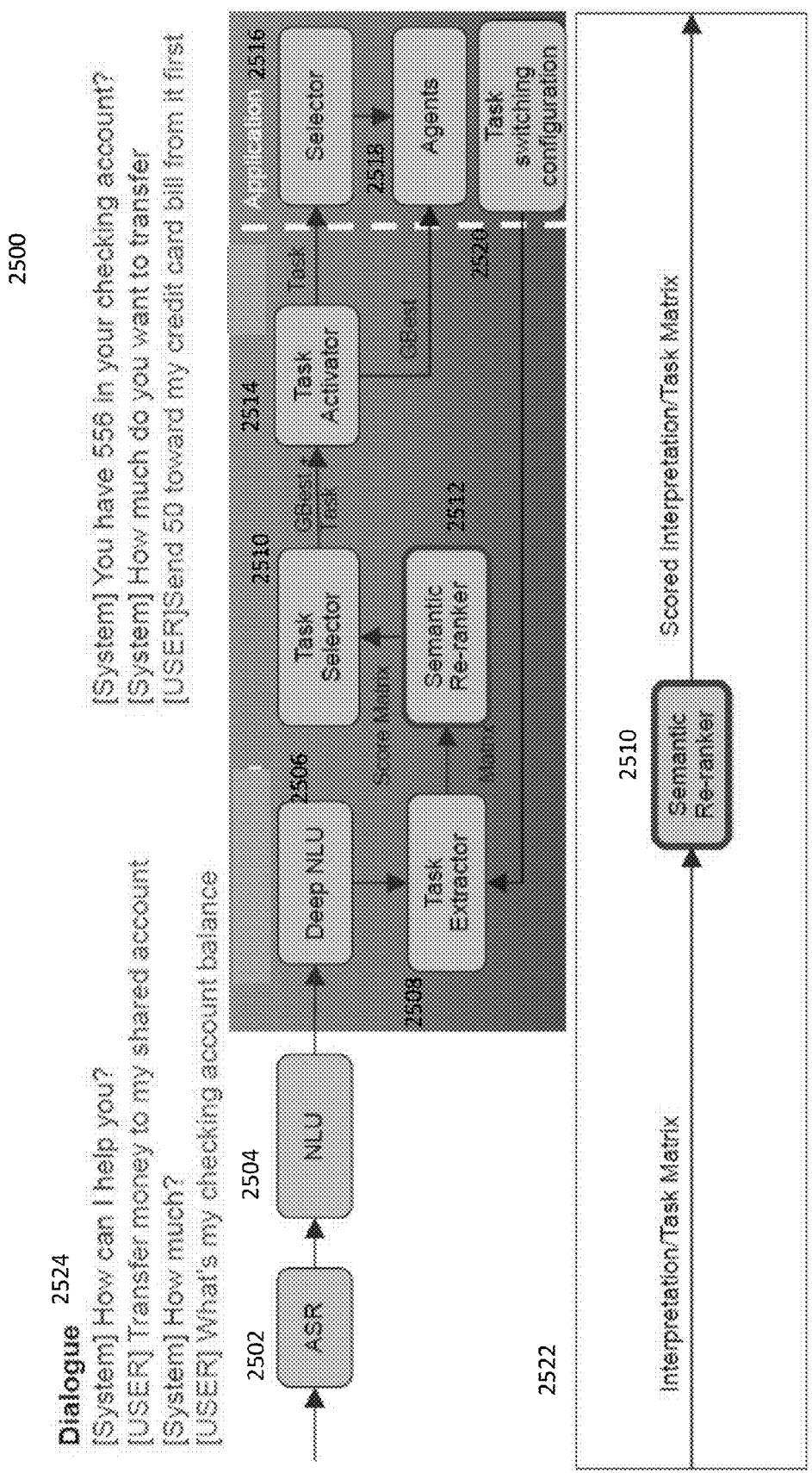
FIG. 29 depicts an illustrative diagram showing an example system in accordance with one or more features described herein.

In FIG. 29, the output from the task extractor 2508 may be passed to the semantic re-ranker 2715. According to some aspects, the output from the task extractor 2508 may comprise one or more of the entries 2710a-x and/or matrix 2700c. The semantic re-ranker 2508 may then attribute an acceptance score to one or more of the entries. The acceptance scores may then be used to determine the most likely interpretation for the current input. For example, the re-ranker 2508 may, for each cell$_{ik}$ of the matrix, extract one or more features used by the re-ranker for the interpretation of the row i in the context of the task of the column k. These features may include the probability that the initial task may be interrupted, the probability that the initial task may be interrupted by the task k, the confidence of the output from the NLU and/or ASR, how well the information in (or corresponding to) the natural language input fits the expected information for a given task, and the like. These features may also include whether the task interruption is allowed or not allowed based on the configuration history. For example, these features may also include whether a task interruption may be allowed by the dialogue application (such as by developers of the application), whether the task interruption might have been previously been allowed or disallowed, and reasons why the switch might be allowed or not.

Based on one or more of these features, the re-ranker 2508 may compute the probability that one or more of the entries 2710a-x (e.g., for each interpretation/task pair) is the most likely interpretation for the current input. According to some aspects, this may be referred to as a probability or statistical based task switching model.

Figure 31:
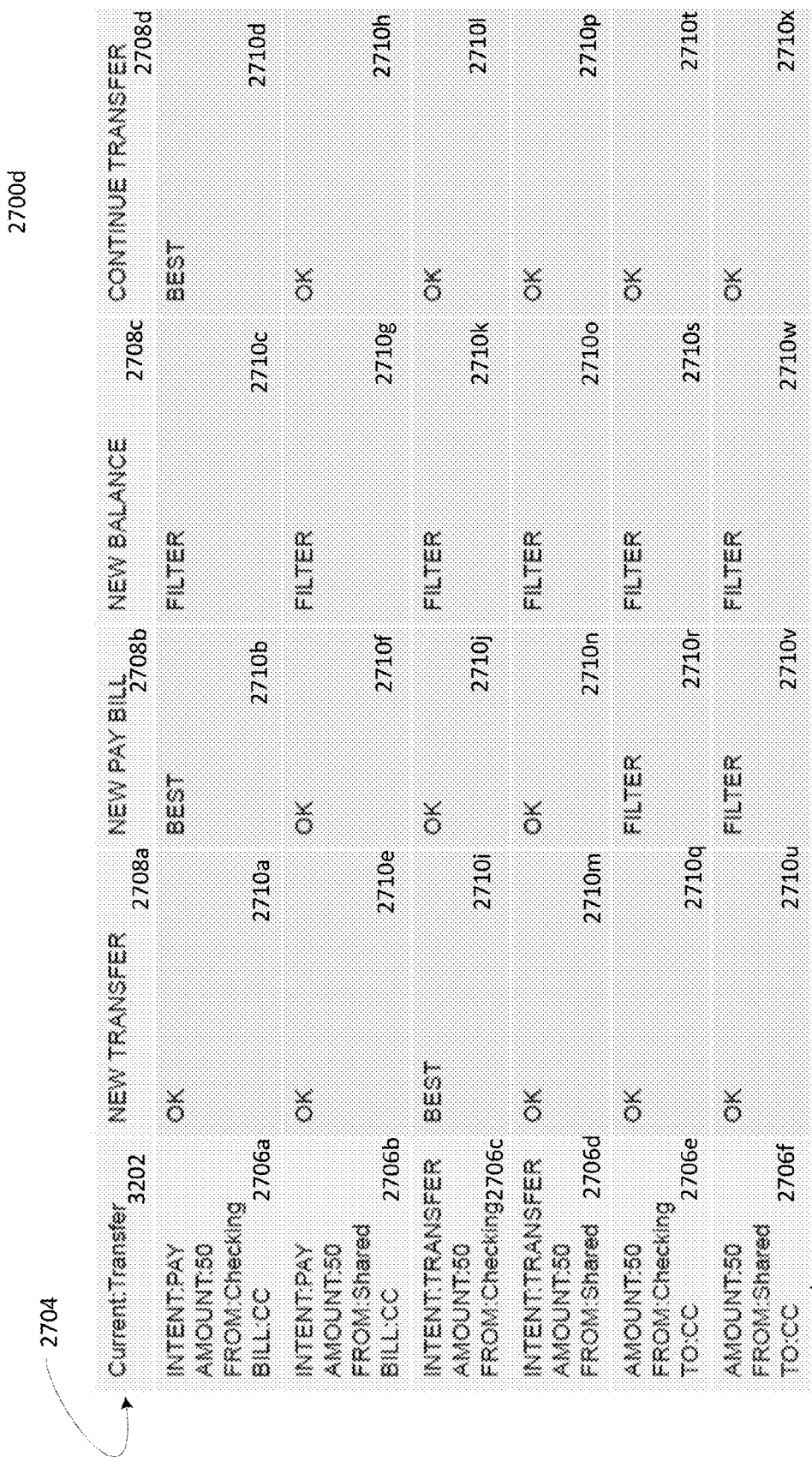
FIG. 31 depicts an example matrix in accordance with one or more features described herein.

FIG. 30 illustrates an example of these probabilities in the matrix 2700d. For example, for entry 2710f, the probability that the user input of "Send 50 toward my credit card bill from it first" has an interpretation of "INTENT: PAY, AMOUNT: 50, FROM: SHARED, BILL: CC" with a task of "PAY BILL" may be 0.3 (e.g., 30%). Additionally, for entry 2710g, the probability that the user input has an interpretation of "INTENT: PAY, AMOUNT: 50, FROM: SHARED, BILL: CC" with a task of "CHECK BALANCE" may be 0 (e.g., 0%). FIG. 31 illustrates another example of how these probabilities may be shown in matrix 2700e. For example, a tag (e.g., BEST, OK, FILTER) may be identified for each entry instead of a numerical value. These tags may correspond to a probability range and/or be associated with a threshold probability. For example, a probability of 0.0-0.0999 may correspond to the "FILTER" tag, a probability of 0.1-0.3 may correspond to the "OK" tag, and a probability of 0.30001-1.0 may correspond to the "BEST" tag. While, three tags are disclosed in this examples, any number of tags corresponding to any ranges of probabilities may be used.

According to some embodiments, the re-ranker 2508 may determine based on one or more of the above features, a rejection probability 3202 for the entire matrix 2700e, as shown in FIG. 32. For example, the rejection probability may be a score and may describe the probability that the entire matrix may be wrong and not correspond to the user input. Thus, the rejection probability may indicate the probability that no entries may correspond to the user input. According to some aspects, in addition to computing the rejection probability of a matrix (e.g., the matrix 2700e), the rejection probability may be computed for one of more entries. As shown in FIG. 32, the rejection probability for this matrix may be 0.05 (e.g., 5%). According to some aspects, any portion of the above matrixes may be transmitted to a computing device (e.g., a database or associated memory).

Figure 33:
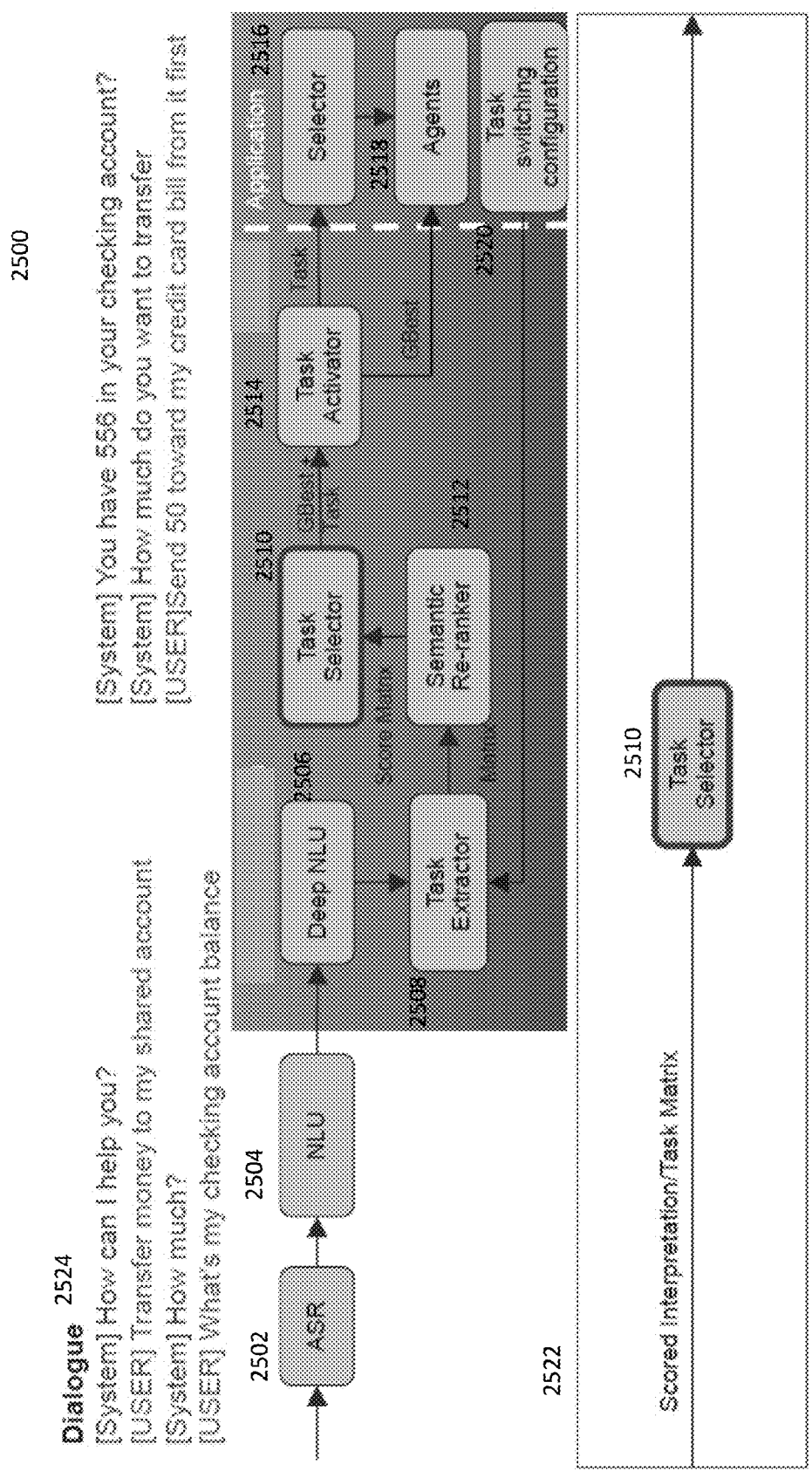
FIG. 33 depicts an example matrix in accordance with one or more features described herein.

In FIG. 33, the output of the semantic re-ranker 2512 (e.g., the scored interpretation/task matrix) may be passed to the task selector 2510. The task selector may select an entry. According to some aspects, the task selector 2510 may select an entry based on one or more rules or restrictions, such as discussed above with respect to charts 328a-c. For example, the task selector 2510 may evaluate the entries based on the rules or restrictions in chart 328c. Thus, the task selector 2510 may find the current task in chart 328c (e.g., transfer task), and then determine if a new pay task can be allowed or refused (e.g., not allowed). Determining that a new pay task might not be allowed during a current transfer task, the task selector 2510 may reject an entry, such as entry 2710b, which may have the highest probability score as determined by the probability based task switching model, and may reject the interpretation and task associated with entry 2710b. Accordingly, in some situations, a task with a high probability (e.g., the highest probability) may be the same as the task selected based on restriction or rules by task selector 2510.

According to some aspects, the task selector 2510 may evaluate entries in order based on their probabilities. For example, the task selector 2510 may choose a highest ranked entry from the matrix 2700d, and determine if the associated task may be allowed based on the rules or restrictions. If the task is not allowed, then the task selector 2510 may proceed to the next highest ranked entry, and so on until the task selector 2510 identifies a task that may be allowed based on the rules or restrictions. According to some aspects, the task selector 2510 may evaluate entries in random order.

According to some aspects, the task selector 2510 may select an entry based on values given to the entries of matrix 2700b from the task extractor 2508, such as shown in FIG. 28. For example, based on matrix 2700b in FIG. 28, task selector 2510 might not select an entry with a value of "REFUSED," while the task selector 2510 may select an entry with a value of "ALLOWED."

According to some aspects, the task selector 2510 may override any rules or restrictions (or other information such as information provided from task extractor 2508) placed on the system (e.g., system 2500) and/or the dialogue application by selecting an entry that might have been refused by the rules or restrictions. For example, if the probability score for that entry is very high (e.g., above a threshold value), then the task selector 2510 may override a rule or restriction that otherwise would have refused that entry, and may then select that entry.

Figure 34:
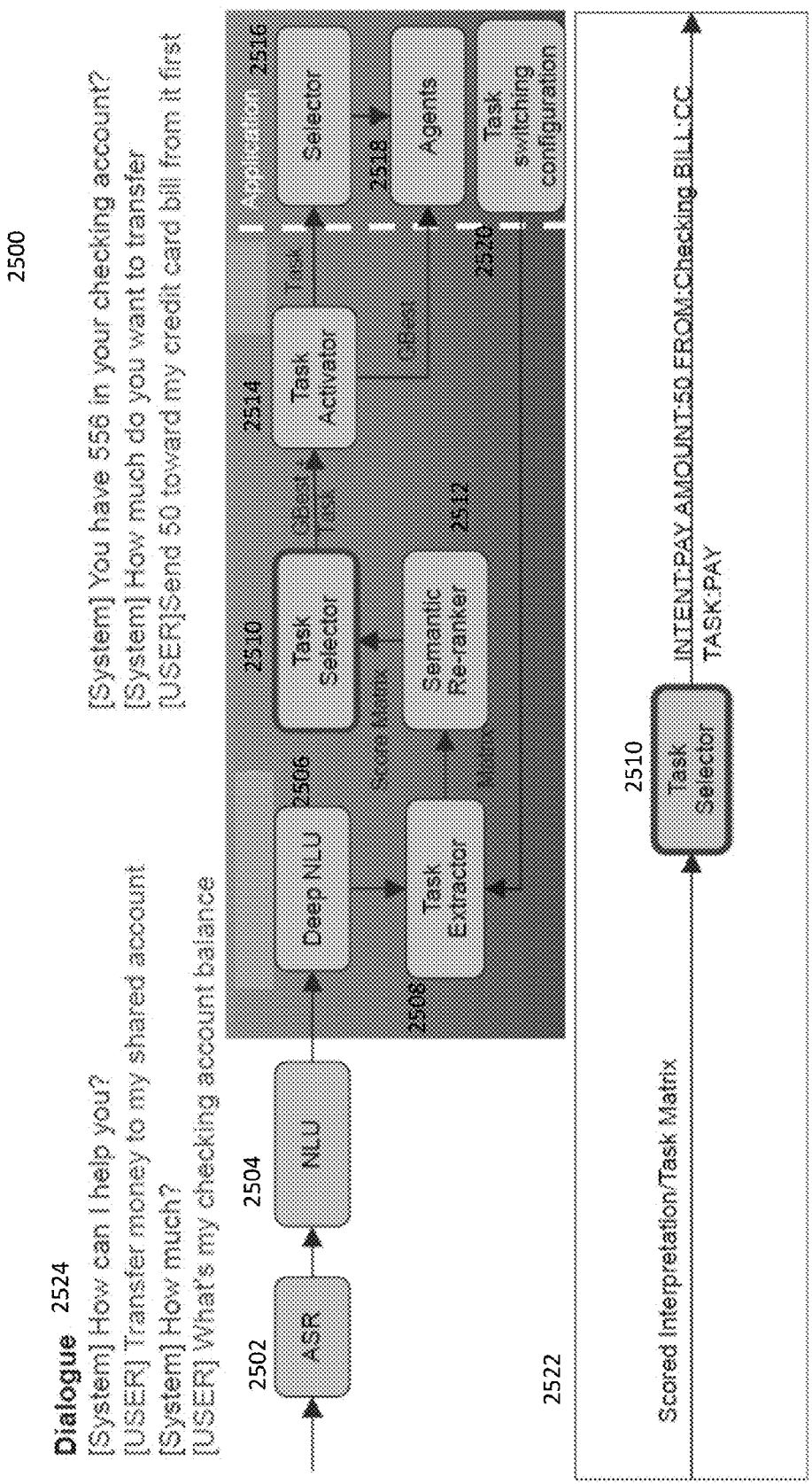
FIG. 34 depicts an illustrative diagram showing an example system in accordance with one or more features described herein.

In FIG. 34, the output (the selected entry) of the task selector 2510 may be passed to the task activator 2514. As shown in FIG. 34, task selector 2510 might select entry 2710b. The task activator 2514 may then stack the old task (e.g., the transfer task), and may activate the new task (e.g., the pay bill task) by sending the relevant slots (e.g., slot 304) to the selector 2016 (e.g., selector 302). In this example, the slot may be the intent of paying a bill. The selector 2016 may then activate the pay task (e.g., task 308) and the corresponding agents 2518. The task activator 2514 may then send information from the interpretation (shown by GBest in FIG. 33) to the activated task's agents 2518 so these agents may gather information from the interpretation. The new task (e.g., pay task) may be processed and completed by system 2500. The old transfer task may then be unstacked and reactivated.

It is noted that in the above example(s), system 2500 was used for a third input of words. In other embodiments and examples, system 2500 may be used for an input prior to or subsequent to a third input of words.

Figure 35:
FIG. 35 depicts an illustrative flow diagram showing an example process of task switching in dialogue processing in accordance with one or more features described herein.

FIG. 35 is an illustrative process 3500 illustrating a flow schematic in accordance with one or more features described herein. Process 3500 may be performed by a system, such as systems 100, 300, 600, 1500, 2000, 2500, and/or 3600. For example, in one or more embodiments, the process 3500 illustrated in FIG. 35 and/or one or more steps thereof may be performed by a computing device (e.g., any device of FIGS. 1-34 and 36). In other embodiments, the process illustrated in FIG. 35 and/or one or more steps thereof may be embodied in computer-executable instructions that are stored in a computer-readable medium, such as a non-transitory computer-readable memory. Any of the disclosed steps (and associated description) in FIG. 35 may be omitted, be performed in other than the recited order, repeated, and/or combined.

Process 3500 may begin with step 3502, in which an ASR component device (e.g., ASR 104) may receive or obtain a first natural language input. The input may be letters, numbers, words, and the like. This input may be from a user or other entity (e.g., animal, computing device, etc.). The input may be input into ASR 104 by a computing device via a user interface. The input may be speech input, typed input, sign language input, and the like. According to some aspects, process 3500 may be performed for one or more natural language inputs.

At step 3504, the input may be transcribed into a transcriptions. For example, ASR 104 may transcribe an input of words into a transcription of words. At step 3506, a NLU component device (e.g., NLU 106 and/or deep NLU 108) may determine a semantic interpretation of the transcription. This interpretation may be based on grammar, anaphora, and the like. At step 3508, a component (e.g., semantic re-ranker 112 and/or task selector 114) may assign/determine a task classification (e.g., transfer task 306, pay bill task 308, check balance task 310, and the like) to the interpretation. The task associated with the assigned classification may then be activated. According to some aspects, this initial task might not be completed (e.g., because an associated agent may need additional information, etc.).

At step 3510, an ASR component device (e.g., ASR 104) may receive or obtain a second or subsequent natural language input of letters, numbers, words and the like, similar to the first input. The ASR 104 may then transcribe the second or subsequent input into one or more transcriptions. At step 3512, a NLU component (e.g., NLU 106 and/or deep NLU 108) may produce/determine one or more semantic interpretations of the transcriptions. These interpretations may be based on grammar, anaphora, and the like. At step 3514, a task selector component (e.g., task selector 110) may generate/create/determine one or more entries corresponding to each interpretation output by the NLU 106 and/or deep NLU 108 and to the tasks supported by system 2500 and/or the dialogue application. Each entry may correspond to a supported task (e.g., tasks supported by the system and/or the dialogue application). According to some aspects, these entries may be organized into a matrix, such as matrix 2700a shown in FIG. 27. At step 3516, a semantic-re-ranker component (e.g., semantic-re-ranker 112) may determine a confidence value for each of the one or more of the entries. The confidence value may be a probability that one or more of the entries (e.g., for each interpretation/task pair) is the most likely interpretation for the current input. This confidence value may be based one or more features, such as the features discussed above with respect to FIGS. 29-33. According to some aspects, process 3500 may be performed for one or more subsequent natural language inputs.

At step 3518, a computing device (e.g., any part of system 100, such as task selector 114) may select a first one of the entries and/or tasks based on the confidence or probability value. This selection may be based on one or more features, such as discussed above with respect to matrixes 2700a-e (e.g., an entry with a highest probability score).

At step 3520, a computing device (e.g., any part of system 100, such as task selector 114) may select a second one of the entries and/or tasks based on one or more rules or restrictions (e.g., rules-based model). This selection may be based on one or more features, such as discussed above with respect to FIG. 34. According to some aspects, the activation of a task identified by the rules-based model may be rejected, such as when a rule might not allow such a task switch. In such situations, the user may try to resolve a particular task. For example, if a task is identified for a user, and then the user does not accept the task, such as by making a subsequent natural language input/command, requesting another tasks operation, and/or canceling out of the current session, the application may determine to modify one or more of the rules or restrictions based on the subsequent natural language input.

At step 3522, an optimal entry and/or task may be identified for the subsequent natural language input. According to some aspects, situations in which the user may try to resolve a particular task may be identified. For example, if a task is chosen for a user (e.g., using the rules-based or the statistical-based model), and then the user does not accept the task, such as by requesting another tasks operation or canceling out of the current session, the application may identify and/or store this task or the next task the user initiates. This information may then be used to determine the optimal task. In another example, if the user inputs a natural language command, and the command does not work (e.g., because of a restriction or rule), the user may change their behavior in order to achieve the user's objective (such as by asking a question or making a command different than a previous command that did not work). This information/process may also be stored by the application. Alternatively, a user (e.g., a developer) may determine an optimal tasks based on additional information, such as by analyzing the natural language input and determining a task for the natural language input.

At step 3524, the statistical model may be optimized or otherwise updated based on a first quality metric. The first quality metric may be based on the identified optimal entry/task. For example, the configuration and accessibility of the tasks of the statistical model may be changed to correspond to identify optimal tasks. According to some aspects, the first quality metric may be based on experience of a user with the application and/or differences between the first candidate tasks identified with the statistical-based task switching model and the second candidate tasks identified with the rule-based task switching model. According to some aspects, the quality metric may be based on the first-entry/task identified by the statistical model and the optimal entry/task. For example, the first entry/task identified based on the confidence values at step 3518 may be compared to the optimal entry identified in step 3522. If the first entry/task does not match the optimal entry, then one or more of the features of the statistical model used to determine the first entry/task may be adjusted and/or changed. For example, these features may include the probability that the initial task may be interrupted, the probability that the initial task may be interrupted by the first task, the confidence of the output from the NLU and/or ASR, how well the information in the input fits the expected information for a given task, and the like. Thus, after one or more task switching situations and/or for one or more subsequent natural language inputs, an overall quality metric may be determined. For example, this quality metric may be the percentage of times the first entry matches the optimal entry. If, for example, the first tasks/entries correspond and/or match (e.g., to within a threshold percentage) the optimal tasks, then the statistical model might not be changed.

At step 3526, a second quality metric may be determined. The second quality metric may be based on whether the first task (or first tasks—for two or more task switching situations and/or for two or more subsequent natural language inputs) identified at step 3518 corresponds to and/or matches the second task (or second tasks—for two or more task switching situations and/or for two or more subsequent natural language inputs) identified at step 3520. For example, the second quality metric may be based on a threshold percentage of times the first task(s) match the second task(s).

At step 3528, it is determined whether to modify at least one of the one or more rules-based task switching rules or restrictions based on whether the second quality metric satisfies a threshold quantity. For example, if the statistical model identified a plurality of first tasks for subsequent inputs (e.g., at 3518), and the rules-based model identified a plurality of second tasks for subsequent inputs (e.g., at step 3520), then it may be determined whether the quality metric determined at step 3526 (e.g., based on the percentage match between the first and second tasks) meets a threshold. Such a threshold may be predetermined (e.g., by a developer of the application, and the like). If the threshold is met/satisfied, then the rules-based model may be modified and/or changed, such as by changing all or a portion of the rules-based model (e.g., changing the associated rules or restrictions) to the statistical model (e.g., the optimized or optimized statistical model). Further, in the above example, if one or more rules of the rules-based model assert that the portion of the first tasks matching the second tasks may not be activated for a subsequent input (e.g., because one or more rules may not allow such activation), then those rules may be modified based on the statistical model having identified the first tasks for the subsequent input. For example, the rules may be changed to now allow activation of the first tasks identified by the statistical model. If the threshold is not met, then the rules-based model might not be modified and/or changed.

According to some aspects, the decision of whether to modify one or more of the rules of the rule-based model may be based on determining accuracies associated with the rules-based model. For example, a computing device (e.g., associated with the application) may determine a first task switching accuracy for the situation in which the one or more rules asserting that the portion of the first tasks matching the second tasks cannot be activated for a subsequent input (e.g., because of the currently activated task at step 3508) are actually enabled/activated. The computing device may then determine a second task switching accuracy for the situation in which the one or more rules asserting that the portion of the first tasks matching the second tasks cannot be activated for a subsequent input are disabled/not activated. According to some aspects, the first or second accuracies may be based on an optimal result or task (e.g., step 3522). The computing device may, after determining that the second accuracy is greater than (or equal to) the first accuracy, modify the one or more rules asserting that the portion of the first tasks matching the second tasks cannot be activated for the subsequent input. Such a modification may be to disable at least one of the one or more of the rules or restrictions, such as by disabling the at least one rule. Additionally or alternatively, the computing device might, after determining that the second accuracy is less than the first accuracy, not modify the one or more rules asserting that the portion of the first tasks matching the second tasks cannot be activated for the subsequent input (e.g., because of the currently activated task at step 3508). According to some aspects, the computing device may determine a confidence interval for the second accuracy based on how often or how frequent (e.g., a percentage of times) the identified first tasks (e.g., from step 3518) correspond and/or match the tasks in which the rules or restrictions identify as not being able to be activated for the subsequent input (e.g., because of the currently activated task at step 3508). According to some aspects, the lower bound of this confidence interval may be used to determine if the second accuracy is greater than the first accuracy.

Process 3500 may then end at step 3530. According to some aspects, process 3500 may end after any step.

FIG. 36 illustrates one example system 3600 of a network architecture and data processing device that may be used to implement one or more illustrative aspects of the disclosure. Various network nodes 3603, 3605, 3607, and 3609 may be interconnected via a wide area network (WAN) 3601, such as the Internet. Other networks may also or alternatively be used, including private intranets, corporate networks, LANs, wireless networks, personal networks (PAN), and the like. Network 3601 is for illustration purposes and may be replaced with fewer or additional computer networks. A local area network (LAN) may have one or more of any known LAN topology and may use one or more of a variety of different protocols, such as Ethernet. Devices 3603, 3605, 3607, 3609 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 3603, web server 3605, and client computers 3607, 3609. Data server 3603 provides overall access, control and administration of databases and control software for performing one or more illustrative aspects of the disclosure as described herein. Data server 3603 may be connected to web server 3605 through which users interact with and obtain data as requested. Alternatively, data server 3603 may act as a web server itself and be directly connected to the Internet. Data server 3603 may be connected to web server 3605 through the network 3601 (e.g., the Internet), via direct or indirect connection, or via some other network. Users may interact with the data server 3603 using remote computers 3607, 3609, e.g., using a web browser to connect to the data server 3603 via one or more externally exposed web sites hosted by web server 3605. Client computers 3607, 3609 may be used in concert with data server 3603 to access data stored therein, or may be used for other purposes. For example, from client device 3607 a user may access web server 3605 using an Internet browser, as is known in the art, or by executing a software application that communicates with web server 3605 and/or data server 3603 over a computer network (such as the Internet).

Servers and applications may be combined on the same physical machines, and retain separate virtual or logical addresses, or may reside on separate physical machines. FIG. 36 illustrates just one example of a network architecture that may be used, and those of skill in the art will appreciate that the specific network architecture and data processing devices used may vary, and are secondary to the functionality that they provide, as further described herein. For example, services provided by web server 3605 and data server 3603 may be combined on a single server.

Each component 3603, 3605, 3607, 3609 may be any type of known computer, server, or data processing device. Data server 3603, e.g., may include a processor 3611 controlling overall operation of the rate server 3603. Data server 3603 may further include RAM 3613, ROM 3615, network interface 3617, input/output interfaces 3619 (e.g., keyboard, mouse, display, printer, etc.), and memory 3621. I/O 3619 may include a variety of interface units and drives for reading, writing, displaying, and/or printing data or files. Memory 3621 may further store operating system software 3623 for controlling overall operation of the data processing device 3603, control logic 3625 for instructing data server 3603 to perform aspects of the disclosure as described herein, and other application software 3627 providing secondary, support, and/or other functionality which might or might not be used in conjunction with aspects of the present disclosure. The control logic may also be referred to herein as the data server software 3625. Functionality of the data server software may refer to operations or decisions made automatically based on rules coded into the control logic, made manually by a user providing input into the system, and/or a combination of automatic processing based on user input (e.g., queries, data updates, etc.).

Memory 3621 may also store data used in performance of one or more aspects of the disclosure, including a first database 3629 and a second database 3631. In some embodiments, the first database may include the second database (e.g., as a separate table, report, etc.). That is, the information can be stored in a single database, or separated into different logical, virtual, or physical databases, depending on system design. Devices 3605, 3607, and 3609 may have similar or different architecture as described with respect to device 3603. Those of skill in the art will appreciate that the functionality of data processing device 3603 (or device 3605, 3607, 3609) as described herein may be spread across multiple data processing devices, for example, to distribute processing load across multiple computers, to segregate transactions based on geographic location, user access level, quality of service (QoS), etc.

One or more aspects of the disclosure may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

One or more embodiments may be implemented in any conventional computer programming language. For example, embodiments may be implemented in a procedural programming language (e.g., "C") or an object-oriented programming language (e.g., "C++", Python). Some embodiments may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions may embody all or part of the functionality previously described herein with respect to the system. Such computer instructions may be written in a number of programming languages for use with one or more computer architectures or operating systems. Furthermore, such instructions may be stored in any memory device, such as semiconductor, magnetic, optical, or other memory devices, and may be transmitted using any communications technology, such as optical, infrared, microwave, or other transmission technologies. Such a computer program product may be distributed as a removable medium with accompanying printed or electronic documentation (e.g., shrink wrapped software), preloaded with a computer system (e.g., on system ROM or fixed disk), or distributed from a server or electronic bulletin board over a network (e.g., the Internet or World Wide Web). Some embodiments may be implemented as a combination of both software (e.g., a computer program product) and hardware. Still other embodiments may be implemented as entirely hardware, or entirely software (e.g., a computer program product).

A described "process" is the performance of a described function in a computer using computer hardware (such as a processor, domain-programmable gate array, or other electronic combinatorial logic, or similar device), which may be operating under control of software or firmware or a combination of any of these or operating outside control of any of the foregoing. All or part of the described function may be performed by active or passive electronic components, such as transistors or resistors. Use of the term "process" does not necessarily imply a schedulable entity, although, in some embodiments, a process may be implemented by such a schedulable entity. Furthermore, unless the context otherwise requires, a "process" may be implemented using more than one processor or more than one (single- or multi-processor) computer and it may be an instance of a computer program or an instance of a subset of the instructions of a computer program.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing devices and one or more networks. The functionality may be distributed in any manner, or may be located in a single computing device (e.g., a server, a client computer, or the like).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method comprising:

receiving, by a computing device comprising a natural language understanding automatic speech recognition computing engine device, a first natural language input comprising one or more words;

activating, by the natural language understanding automatic speech recognition computing engine device, a first task based on the first natural language input, wherein the first task is associated with one or more first task agents configured for retrieving information associated with the first task;

prompting, by the natural language understanding automatic speech recognition computing engine device and via a first of the one or more first task agents, for a subsequent natural language input based on a first transcription of the first natural language input and based on a first intent associated with the first task;

receiving, by the natural language understanding automatic speech recognition computing engine device and while the first task is activated, a second natural language input comprising one or more words;

responsive to determining, by the natural language understanding automatic speech recognition computing engine device, that a task activation switching parameter associated with the first task is not a false value and that a second intent associated with the second natural language input is different from the first intent associated with the first task, determining, by the natural language understanding automatic speech recognition computing engine device:

one or more candidate second tasks that are capable of being activated based on one or more task switching rules that identify one or more tasks that are allowed to interrupt the activated first task, wherein an interrupted task is arranged in a task stack memory component of the computing device; and one or more candidate third tasks that are incapable of being activated based on the one or more task switching rules;

activating, by the natural language understanding automatic speech recognition computing engine device, one of the one or more candidate second tasks, wherein the activated candidate second task is associated with one or more second task agents configured for retrieving information associated with the activated candidate second task;

responsive to satisfying the one or more second task agents with the first natural language input, the second natural language input, or an additional natural language input, performing, by the computing device, an action associated with the activated second candidate task;

determining, by the natural language understanding automatic speech recognition computing engine device, whether the second natural language input satisfies the one or more first task agents associated with the first task;

performing, by the computing device, an action associated with the first task responsive to the second natural language input satisfying the one or more first task agents; and prompting, by the natural language understanding automatic speech recognition computing engine device and via one of the one or more first task agents, for a second subsequent natural language input based on the first transcription of the first natural language input responsive to the second natural language input not satisfying the one or more first task agents.

2. The method of claim 1, further comprising:
responsive to activating the one candidate second task, pausing the first task at a first point;
resuming the first task at the first point responsive to the second input not satisfying the one or more first task agents;
prompting, via the first of the one or more first task agents, for the second subsequent natural language input; and
performing the action associated with the first task responsive to receiving at least one additional natural language input that satisfies the one or more first task agents.

3. The method of claim 1, wherein the activating the one of the one or more candidate second tasks comprises:
determining a confidence score for each of the one or more candidate second tasks via a statistical-based task switching model;
identifying one of the one or more scored candidate second tasks that is associated with a high score; and
activating the identified scored candidate second task associated with the high score.

4. The method of claim 1, further comprising:
determining a confidence score for each of the one or more candidate second tasks and for each of the one or more third candidate tasks via a statistical-based task switching model; and
responsive to identifying a scored candidate third task associated with a high score compared to the scored one or more second candidate tasks, modifying at least one of the one or more task switching rules, wherein the modification is based on the scored candidate third task associated with the high score.

5. The method of claim 4,
wherein the modifying the at least one of the or more task switching rules comprises modifying a task switching rule associated with the scored candidate third task associated with the high score,
wherein the determining the one or more candidate second tasks that are capable of being activated based on the one or more task switching rules comprises determining that the scored candidate third task associated with the high score is capable of being activated based on the modified task switching rule; and
wherein the activating the one of the one or more candidate second tasks comprises activating the scored candidate third task associated with the high score.

6. The method of claim 1, wherein the satisfying the one or more second task agents comprises:
prompting, via the one or more second task agents, for an additional natural language input associated with the second task;

receiving at least one natural language input associated with the second task; and
satisfying the one or more second task agents with a transcription of the received at least one natural language input associated with the second task.

7. The method of claim 1, further comprising:
receiving, while the first task and the activated candidate second task are activated, a third natural language input comprising one or more words;
responsive to determining that a third intent associated with the third natural language input is different from the first intent associated with the first task and from the second intent associated with the second natural language input, determining one or more candidate fourth tasks that are capable of being activated based on one or more second task switching rules that identify one or more tasks that are allowed to interrupt the activated first task and the activated candidate second task;
activating one of the one or more candidate fourth tasks, wherein the activated candidate fourth task is associated with one or more fourth task agents; and
responsive to satisfying the one or more fourth task agents, performing an action associated with the activated fourth candidate task.

8. The method of claim 7, wherein satisfying the one or more second task agents comprises satisfying the one or more second task agents with a transcription of the third natural language input.

9. A system, comprising:
at least one processor; and
at least one memory storing instructions that, when executed by the at least one processor, cause the system to perform:
receiving, by a computing device comprising a natural language understanding automatic speech recognition computing engine device, a first natural language input comprising one or more words;
activating, by the natural language understanding automatic speech recognition computing engine device, a first task based on the first natural language input, wherein the first task is associated with one or more first task agents configured for retrieving information associated with the first task;
prompting, by the natural language understanding automatic speech recognition computing engine device and via a first of the one or more first task agents, for a subsequent natural language input based on a first transcription of the first natural language input and based on a first intent associated with the first task;
receiving, by the natural language understanding automatic speech recognition computing engine device and while the first task is activated, a second natural language input comprising one or more words;
responsive to determining, by the natural language understanding automatic speech recognition computing engine device, that a task activation switching parameter associated with the first task is not a false value and that a second intent associated with the second natural language input is different from the first intent associated with the first task, determining, by the natural language understanding automatic speech recognition computing engine device:
one or more candidate second tasks that are capable of being activated based on one or more task switching rules that identify one or more tasks that are allowed to interrupt the activated first task, wherein an interrupted task is arranged in a task stack memory component of the computing device; and
one or more candidate third tasks that are incapable of being activated based on the one or more task switching rules;
activating, by the natural language understanding automatic speech recognition computing engine device, one of the one or more candidate second tasks, wherein the activated candidate second task is associated with one or more second task agents configured for retrieving information associated with the activated candidate second task;
responsive to satisfying the one or more second task agents with the first natural language input, the second natural language input, or an additional natural language input, performing, by the computing device, an action associated with the activated second candidate task;
determining, by the natural language understanding automatic speech recognition computing engine device, whether the second natural language input satisfies the one or more first task agents associated with the first task;
performing, by the computing device, an action associated with the first task responsive to the second natural language input satisfying the one or more first task agents; and
prompting, by the natural language understanding automatic speech recognition computing engine device and via one of the one or more first task agents, for a second subsequent natural language input based on the first transcription of the first natural language input responsive to the second natural language input not satisfying the one or more first task agents.

10. The system of claim 9, wherein the instructions further cause the system to perform:
responsive to activating the one candidate second task, pausing the first task at a first point;
resuming the first task at the first point responsive to the second input not satisfying the one or more first task agents;
prompting, via the first of the one or more first task agents, for the second subsequent natural language input; and
performing the action associated with the first task responsive to receiving at least one additional natural language input that satisfies the one or more first task agents.

11. The system of claim 9, wherein the activating the one of the one or more candidate second tasks comprises:
determining a confidence score for each of the one or more candidate second tasks via a statistical-based task switching model;
identifying one of the one or more scored candidate second tasks that is associated with a high score; and
activating the identified scored candidate second task associated with the high score.

12. The system of claim 9, wherein the instructions further cause the system to perform:
determining a confidence score for each of the one or more candidate second tasks and for each of the one or more third candidate tasks via a statistical-based task switching model; and
responsive to identifying a scored candidate third task associated with a high score compared to the scored one or more second candidate tasks, modifying at least one of the one or more task switching rules, wherein the modification is based on the scored candidate third task associated with the high score.

13. The system of claim 12,
wherein the modifying the at least one of the or more task switching rules comprises modifying a task switching rule associated with the scored candidate third task associated with the high score,
wherein the determining the one or more candidate second tasks that are capable of being activated based on the one or more task switching rules comprises determining that the scored candidate third task associated with the high score is capable of being activated based on the modified task switching rule; and
wherein the activating the one of the one or more candidate second tasks comprises activating the scored candidate third task associated with the high score.

14. The system of claim 9, wherein the satisfying the one or more second task agents comprises:
prompting, via the one or more second task agents, for an additional natural language input associated with the second task;
receiving at least one natural language input associated with the second task; and
satisfying the one or more second task agents with a transcription of the received at least one natural language input associated with the second task.

15. The system of claim 9, wherein the instructions further cause the system to perform:
receiving, while the first task and the activated candidate second task are activated, a third natural language input comprising one or more words;
responsive to determining that a third intent associated with the third natural language input is different from the first intent associated with the first task and from the second intent associated with the second natural language input, determining one or more candidate fourth tasks that are capable of being activated based on one or more second task switching rules that identify one or more tasks that are allowed to interrupt the activated first task and the activated candidate second task;
activating one of the one or more candidate fourth tasks, wherein the activated candidate fourth task is associated with one or more fourth task agents; and
responsive to satisfying the one or more fourth task agents, performing an action associated with the activated fourth candidate task.

16. The system of claim 15, wherein satisfying the one or more second task agents comprises satisfying the one or more second task agents with a transcription of the third natural language input.

17. One or more non-transitory computer-readable storage media having instructions stored thereon, that when executed by one or more processors, cause the one or more processors to perform:
receiving, by a computing device comprising a natural language understanding automatic speech recognition computing engine device, a first natural language input comprising one or more words;
activating, by the natural language understanding automatic speech recognition computing engine device, a first task based on the first natural language input, wherein the first task is associated with one or more first task agents configured for retrieving information associated with the first task;
prompting, by the natural language understanding automatic speech recognition computing engine device and via a first of the one or more first task agents, for a subsequent natural language input based on a first transcription of the first natural language input and based on a first intent associated with the first task;

receiving, by the natural language understanding automatic speech recognition computing engine device and while the first task is activated, a second natural language input comprising one or more words;

responsive to determining, by the natural language understanding automatic speech recognition computing engine device, that a task activation switching parameter associated with the first task is not a false value and that a second intent associated with the second natural language input is different from the first intent associated with the first task, determining, by the natural language understanding automatic speech recognition computing engine device:

one or more candidate second tasks that are capable of being activated based on one or more task switching rules that identify one or more tasks that are allowed to interrupt the activated first task, wherein an interrupted task is arranged in a task stack memory component of the computing device; and one or more candidate third tasks that are incapable of being activated based on the one or more task switching rules;

activating, by the natural language understanding automatic speech recognition computing engine device, one of the one or more candidate second tasks, wherein the activated candidate second task is associated with one or more second task agents configured for retrieving information associated with the activated candidate second task;

responsive to satisfying the one or more second task agents with the first natural language input, the second natural language input, or an additional natural language input, performing, by the computing device, an action associated with the activated second candidate task;

determining, by the natural language understanding automatic speech recognition computing engine device, whether the second natural language input satisfies the one or more first task agents associated with the first task;

performing, by the computing device, an action associated with the first task responsive to the second natural language input satisfying the one or more first task agents; and prompting, by the natural language understanding automatic speech recognition computing engine device and via one of the one or more first task agents, for a second subsequent natural language input based on the first transcription of the first natural language input responsive to the second natural language input not satisfying the one or more first task agents.

18. The one or more non-transitory computer-readable storage media of claim 17, wherein the instructions further cause the one or more processors to perform:

determining a confidence score for each of the one or more candidate second tasks and for each of the one or more third candidate tasks via a statistical-based task switching model; and responsive to identifying a scored candidate third task associated with a high score compared to the scored one or more second candidate tasks, modifying at least one of the one or more task switching rules, wherein the modification is based on the scored candidate third task associated with the high score.

19. The one or more non-transitory computer-readable storage media of claim 18, wherein the modifying the at least one of the or more task switching rules comprises modifying a task switching rule associated with the scored candidate third task associated with the high score, wherein the determining the one or more candidate second tasks that are capable of being activated based on the one or more task switching rules comprises determining that the scored candidate third task associated with the high score is capable of being activated based on the modified task switching rule; and wherein the activating the one of the one or more candidate second tasks comprises activating the scored candidate third task associated with the high score.

20. The one or more non-transitory computer-readable storage media of claim 17, wherein the instructions further cause the one or more processors to perform:

receiving, while the first task and the activated candidate second task are activated, a third natural language input comprising one or more words;

responsive to determining that a third intent associated with the third natural language input is different from the first intent associated with the first task and from the second intent associated with the second natural language input, determining one or more candidate fourth tasks that are capable of being activated based on one or more second task switching rules that identify one or more tasks that are allowed to interrupt the activated first task and the activated candidate second task;

activating one of the one or more candidate fourth tasks, wherein the activated candidate fourth task is associated with one or more fourth task agents; and responsive to satisfying the one or more fourth task agents, performing an action associated with the activated fourth candidate task.

* * * * *